(12) United States Patent
Paper et al.

(10) Patent No.: US 11,872,946 B2
(45) Date of Patent: Jan. 16, 2024

(54) SOFT IDENTIFICATION PLATE AND METHOD THEREFOR

(71) Applicants: Adam Scott Paper, Santa Monica, CA (US); Malissa Ann Wise, Santa Monica, CA (US)

(72) Inventors: Adam Scott Paper, Santa Monica, CA (US); Malissa Ann Wise, Santa Monica, CA (US)

( * ) Notice: Subject to any disclaimer, the term of this patent is extended or adjusted under 35 U.S.C. 154(b) by 0 days.

(21) Appl. No.: 17/538,519

(22) Filed: Nov. 30, 2021

(65) Prior Publication Data

US 2022/0169187 A1 Jun. 2, 2022

Related U.S. Application Data

(60) Provisional application No. 63/208,326, filed on Jun. 8, 2021, provisional application No. 63/120,121, filed on Dec. 1, 2020.

(51) Int. Cl.
| | |
|---|---|
| *B60R 13/10* | (2006.01) |
| *G09F 13/16* | (2006.01) |
| *G06K 19/06* | (2006.01) |
| *G06K 19/07* | (2006.01) |
| *G02B 5/12* | (2006.01) |

(52) U.S. Cl.
CPC ........ *B60R 13/10* (2013.01); *G06K 19/06037* (2013.01); *G06K 19/0723* (2013.01); *G09F 13/16* (2013.01); *G02B 5/12* (2013.01)

(58) Field of Classification Search
CPC ............ B60R 13/10; G09F 13/16; G02B 5/12
See application file for complete search history.

(56) References Cited

U.S. PATENT DOCUMENTS

| | | | | |
|---|---|---|---|---|
| 6,324,778 | B1 * | 12/2001 | Gall | B60R 13/10 40/594 |
| 7,204,909 | B1 * | 4/2007 | Curiel | B60R 13/105 40/910 |
| 11,034,312 | B2 | 6/2021 | Mendoza | |
| 2003/0090797 | A1 * | 5/2003 | Mueller | G09F 13/22 359/515 |
| 2007/0171077 | A1 * | 7/2007 | Kawarizadeh | B60R 11/0264 340/572.8 |
| 2015/0170019 | A1 * | 6/2015 | Beenken | G06K 19/0724 235/492 |
| 2015/0183384 | A1 * | 7/2015 | Mendoza | B60R 13/105 40/208 |

* cited by examiner

*Primary Examiner* — Gary C Hoge
(74) *Attorney, Agent, or Firm* — Wayne S. Breyer; Kaplan Breyer Schwarz, LLP

(57) ABSTRACT

A license plate assembly includes a backing and a flexible license plate. The flexible license plate includes plural layers, including a licensing-information layer, in which ink is deposited in the form of alphanumeric characters on an underlying one of the plural layers, the alphanumeric characters providing license information. The flexible license plate optionally includes one or more holograms, and/or watermarks, and/or QR-codes. The flexible license plate is disposed on the backing, which extends beyond the perimeter of the flexible license plate, defining a marginal region. In some embodiments, plural indices are disposed in the marginal region to facilitate alignment of flexible license plate during installation thereof on a motor vehicle.

23 Claims, 16 Drawing Sheets

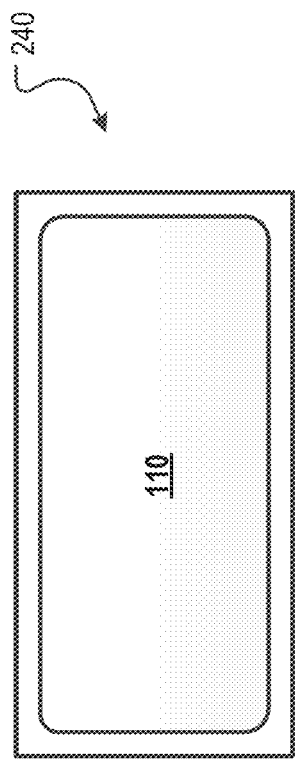
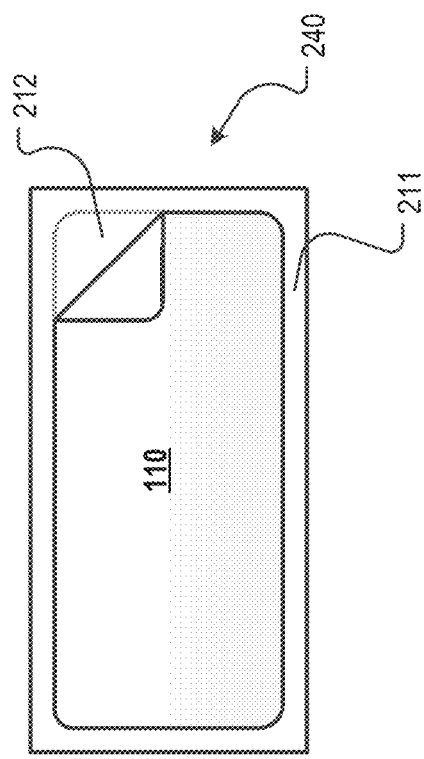
FIG. 2A
FIG. 2B

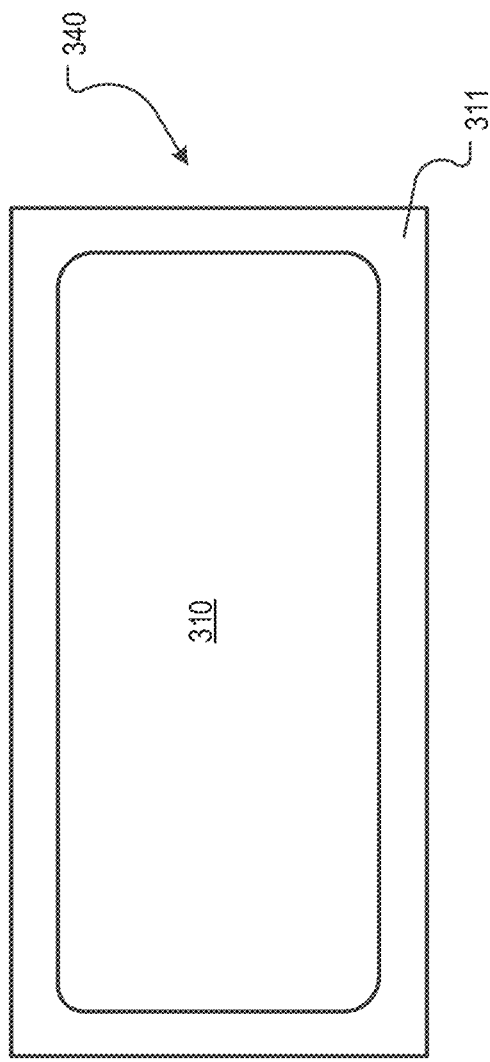
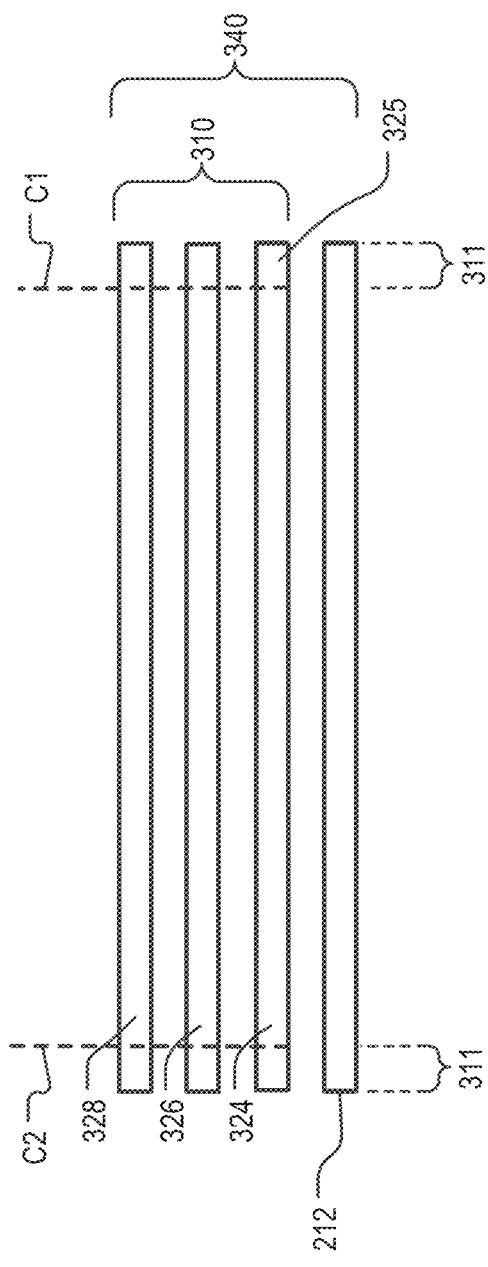

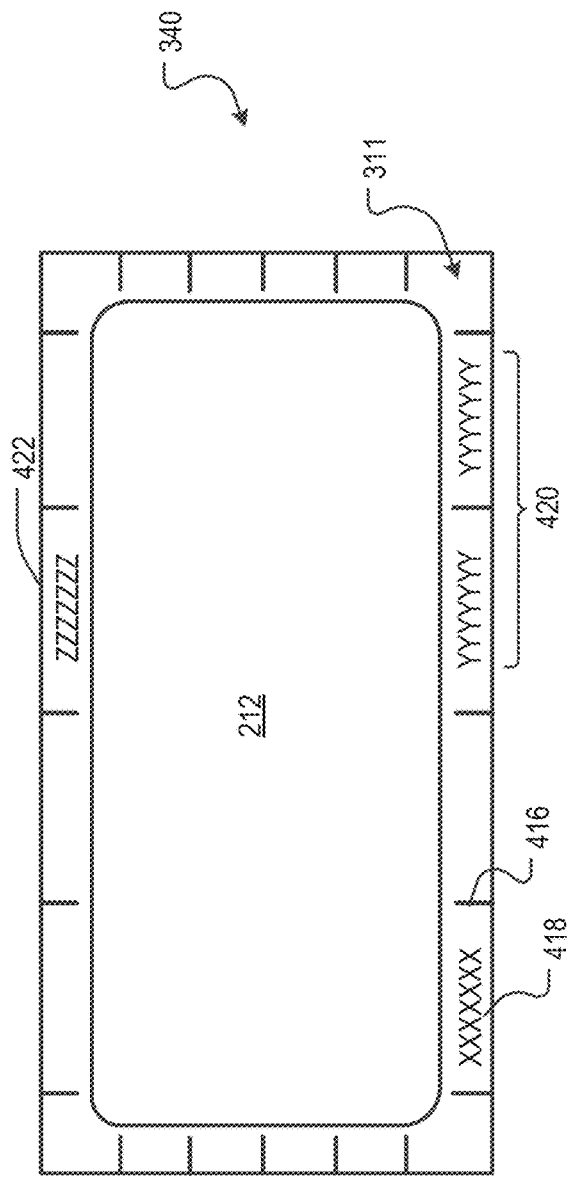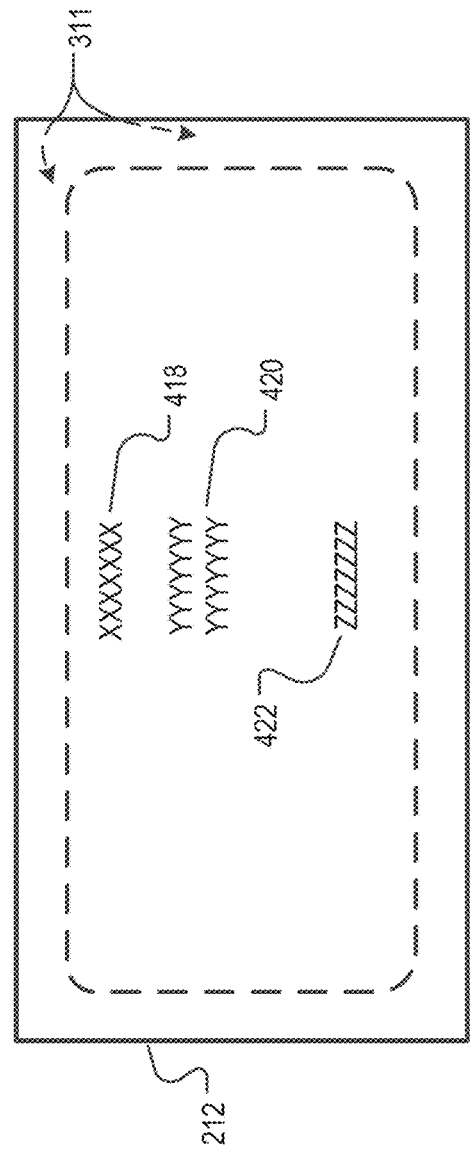

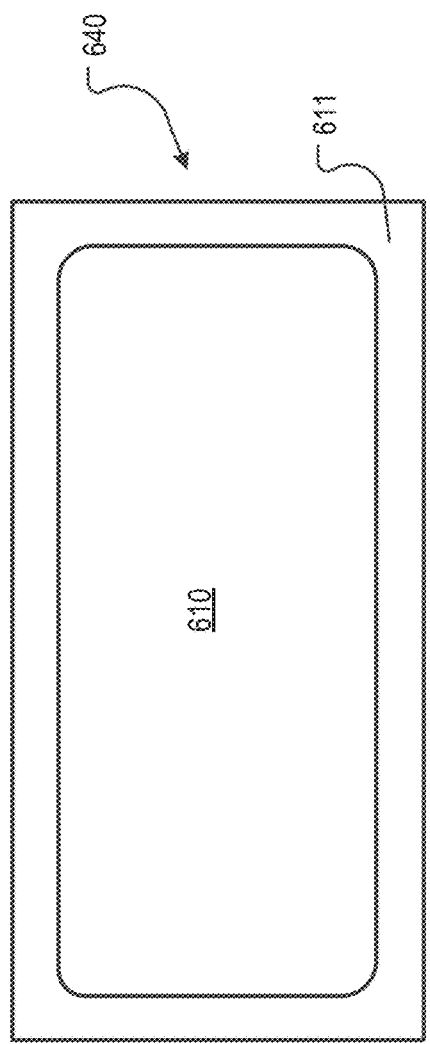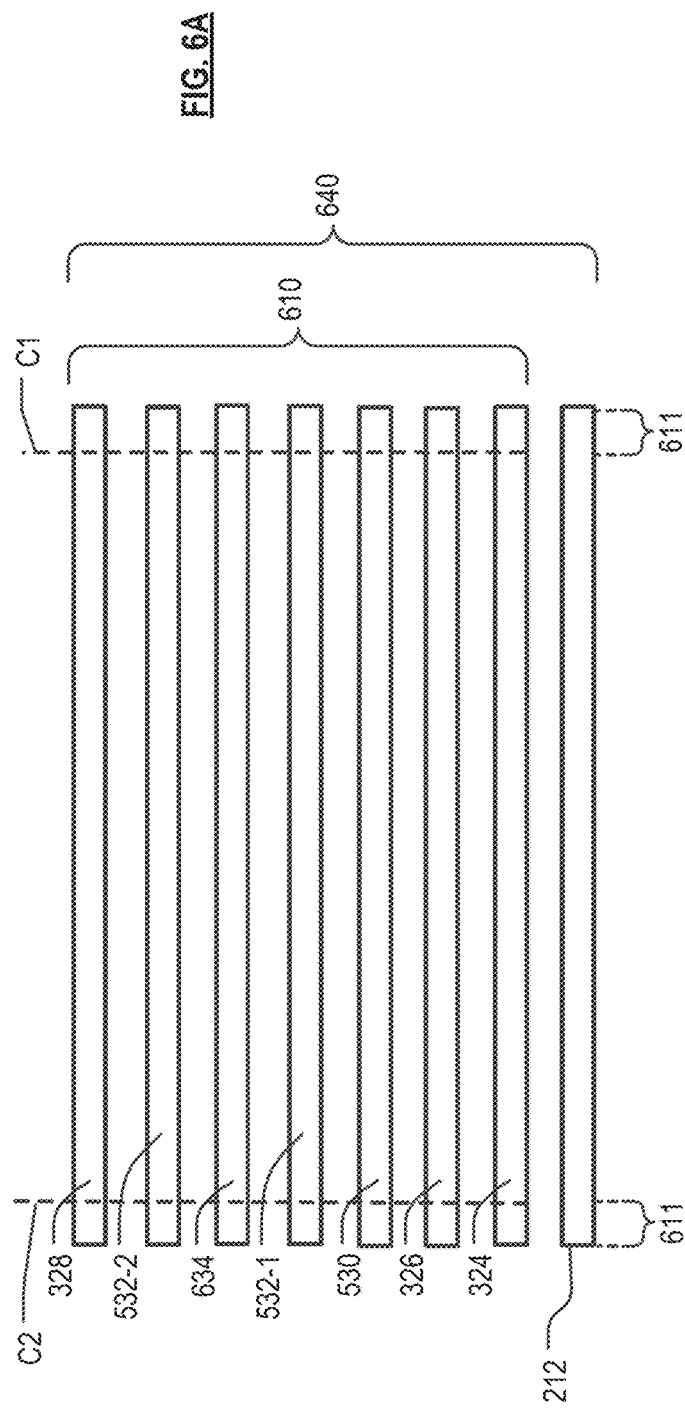

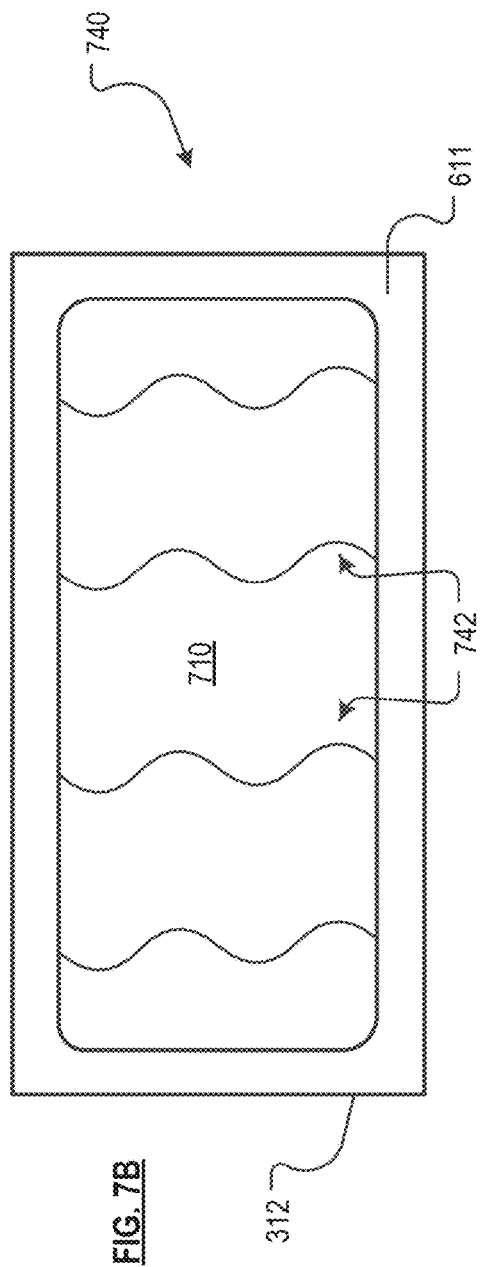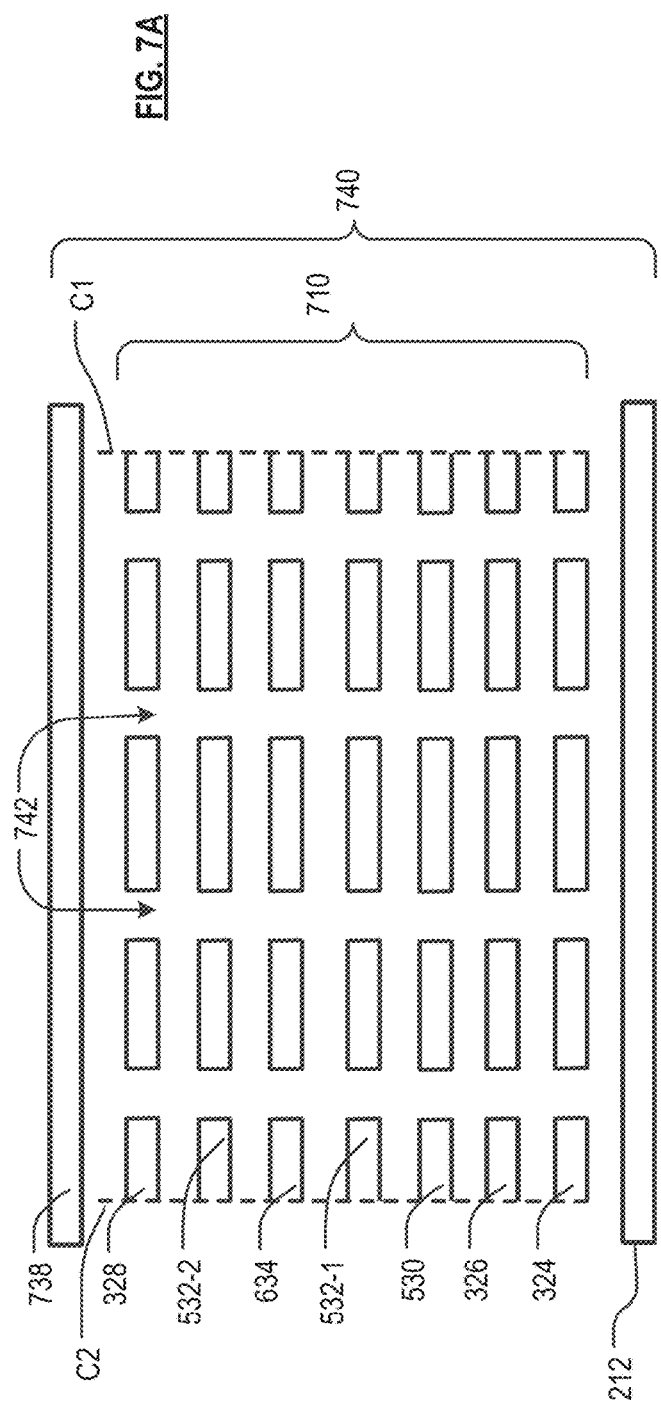

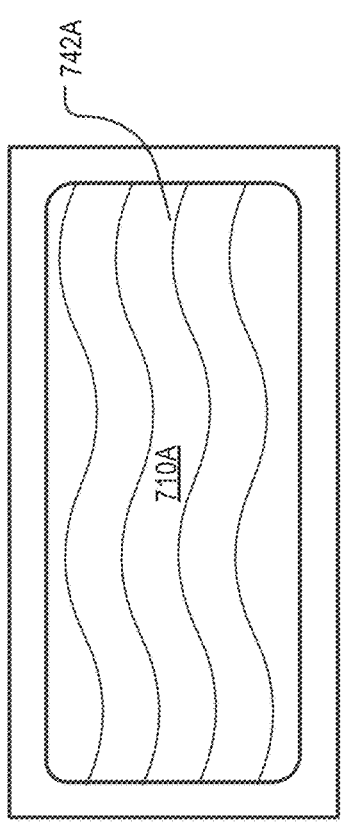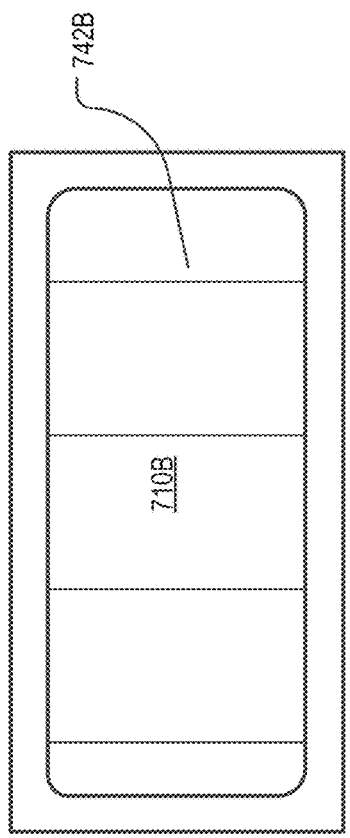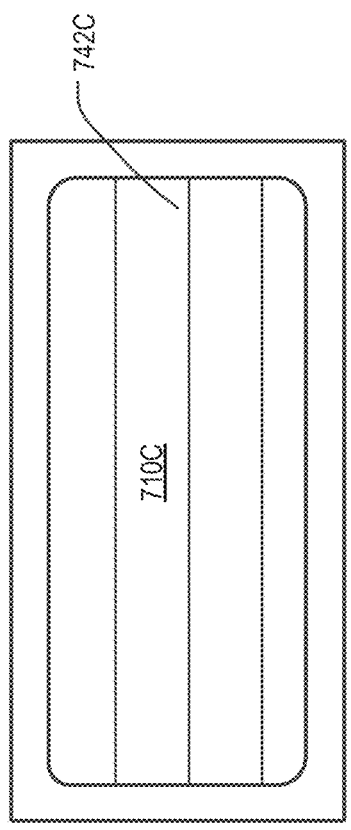

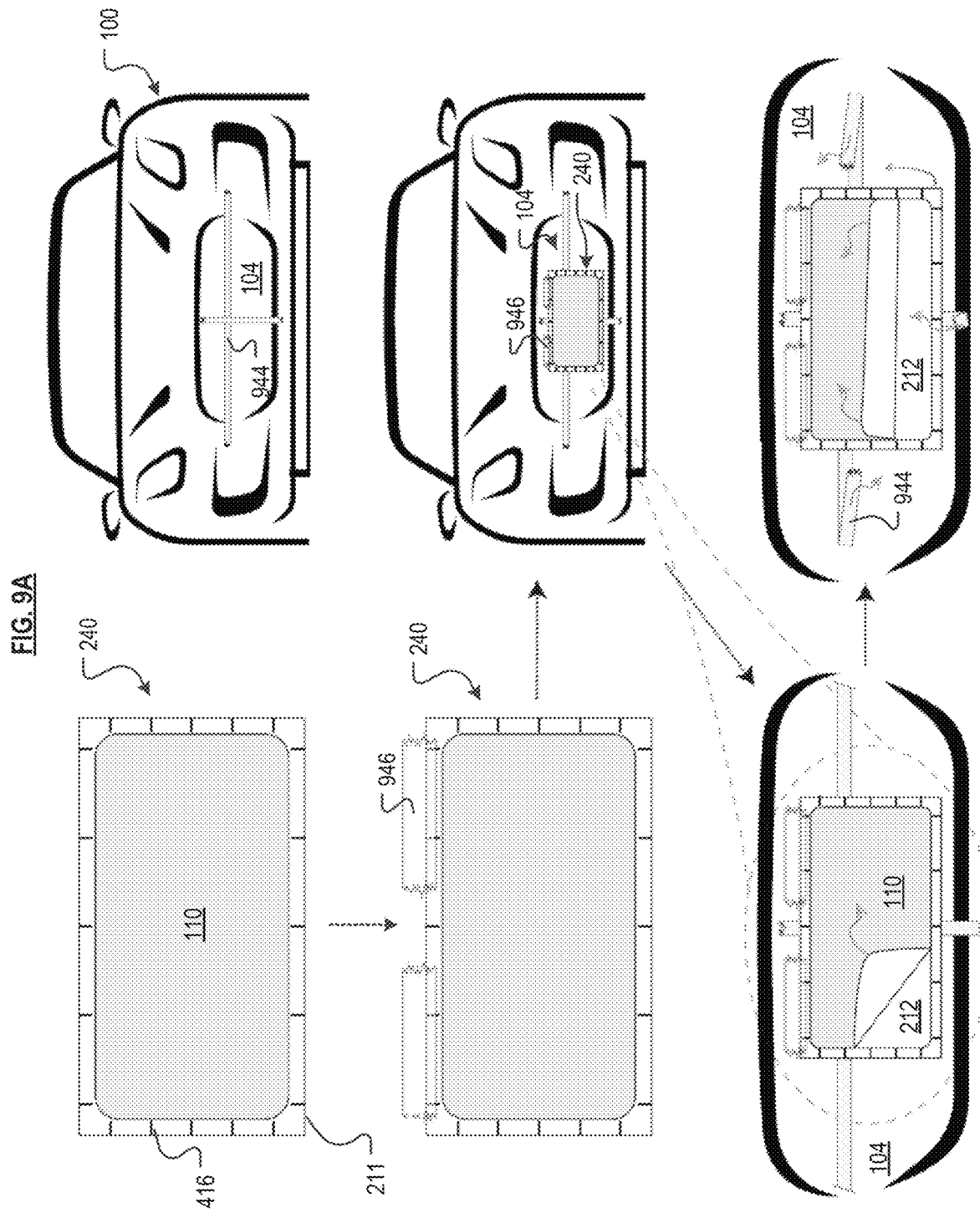

FIG. 10A
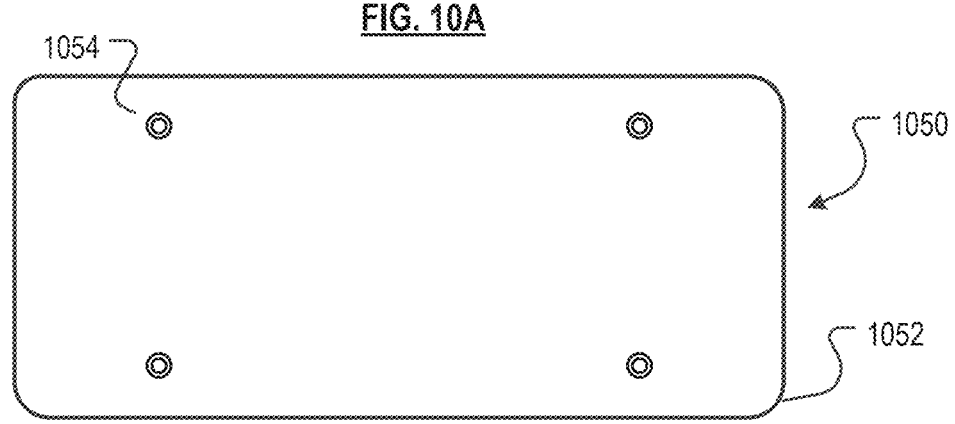
FIG. 10B
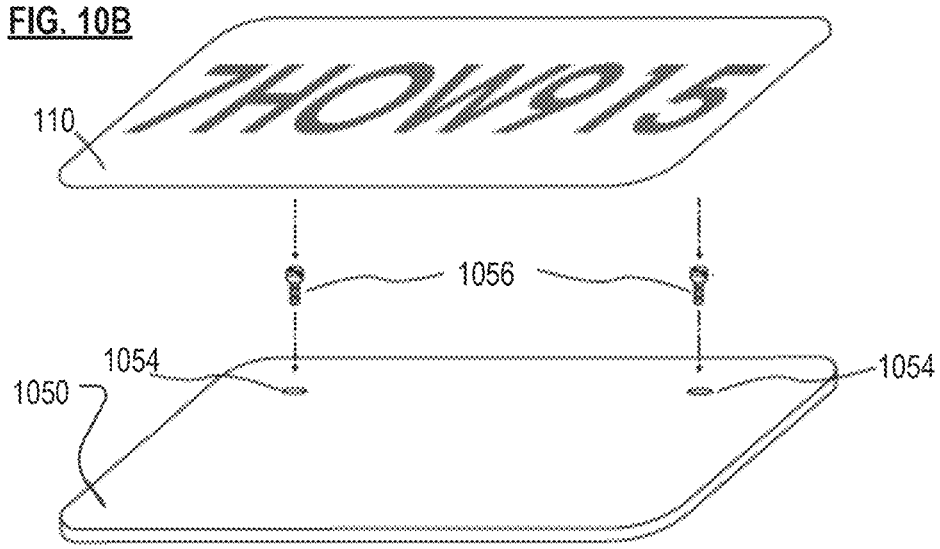
FIG. 10C

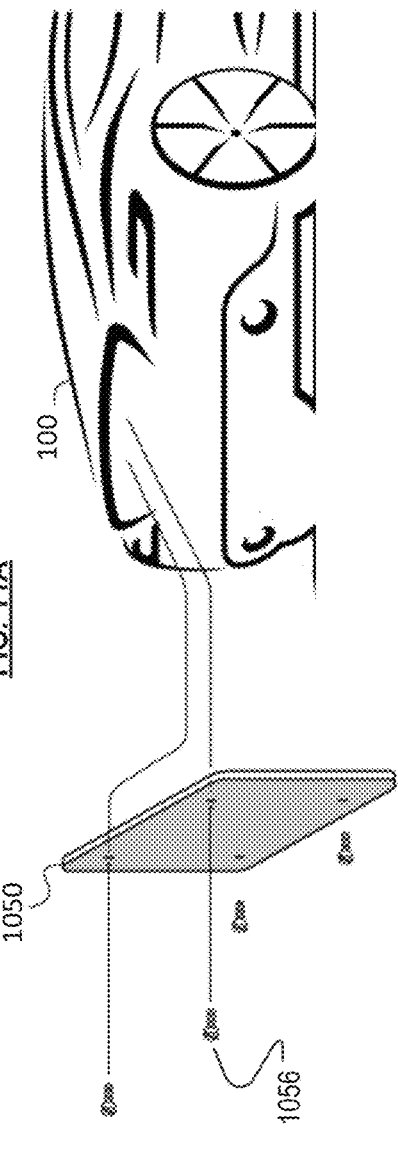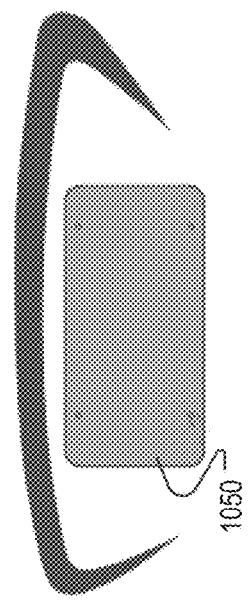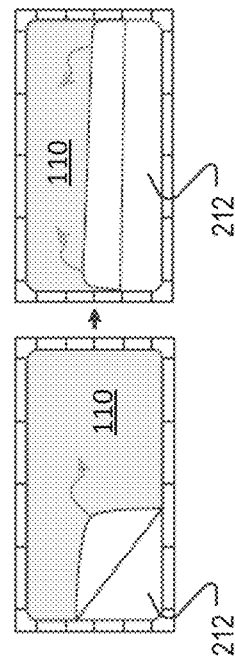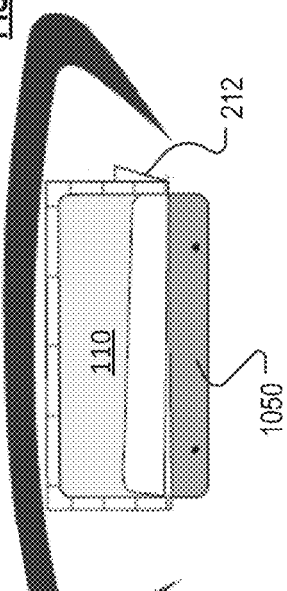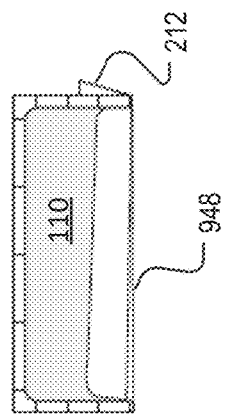

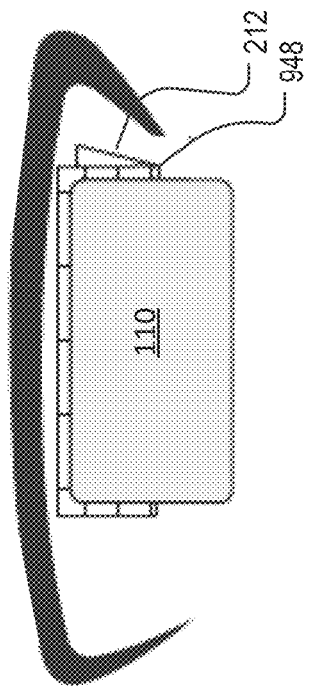
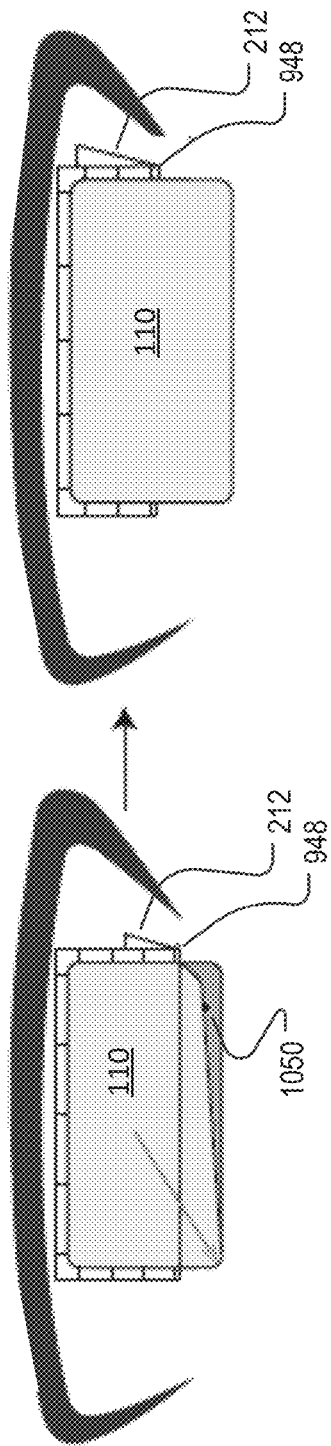
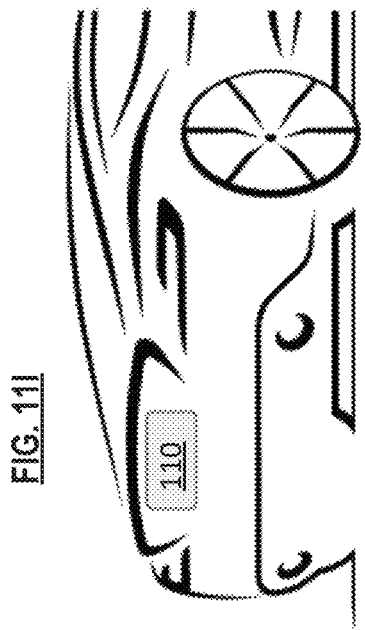
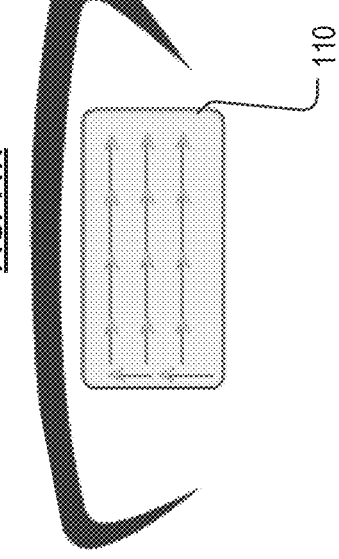

SOFT IDENTIFICATION PLATE AND METHOD THEREFOR

STATEMENT OF RELATED CASES

This case claims priority to U.S. Pat. App. Ser. No. 63/120,121 filed Dec. 1, 2020, and U.S. Pat. App. Ser. No. 63/208,326 filed Jun. 8, 2021, both of applications are incorporated by reference herein.

FIELD OF THE INVENTION

The present invention relates to identification or registration plates, such as vehicular license plates.

BACKGROUND OF THE INVENTION

Vehicular license plates are designed to be an easily recognizable identification plaque for state-registered and off-highway motor vehicles. These license plates are rigid, and are normally constructed from painted plastics, painted aluminum, or vinyl-wrapped aluminum. The license plates are externally mounted on a vehicle, at one or both ends, traditionally by mechanical fasteners and a mounting plate, frame, or pedestal. At the front of a vehicle, license plates are traditionally mounted to a vertical, centered, and leading-edge area of the front bumper. At back, the plates are traditionally mounted to the rear bumper, or the region above it, centered within a recessed section of the hatch or trunk-lid.

Although effective for vehicle identification, these plates lack, to varying degrees, installation flexibility and are devoid of technological benefit. Moreover, although most states offer various versions of the state-approved license plate with the intent of providing a degree of personalization or improved aesthetics, when a conventional license plate is mounted at the front of the vehicle, it typically detracts, sometimes greatly, from overall vehicle aesthetics.

SUMMARY OF THE INVENTION

The present invention provides an identification/registration plate, and a manufacturing process for fabricating the plate, that overcome some of the costs and drawbacks of the prior art.

The inventors realized that vehicular license plates have remained virtually unchanged for over 100 years. For example, the prior art continues to use metal alloy or thick plastic materials for license-plate manufacturing, requiring large-scale multi-ton machinery, presses, stamps and dies, along with a large labor force. Furthermore, the need to physically screw or bolt a license plate into a vehicle's bumper or couple a mounting device thereto causes irreversible damage to the vehicle. Additionally, there is no straightforward way to prevent illegal, physical alterations to prior-art license plates, nor is there an intuitive method for preventing illegal removal or repurposing thereof. Moreover, the majority of vehicular license plates are susceptible to physical alterations in attempt to circumvent state-based optical enforcement devices such as photo-enforcement speed zones or traffic-light intersection photo-capture systems. And traditional mounting arrangements for the front license plate are often ill-suited to the sleek look of performance automobiles, and are a bane of many auto-enthusiast owners of such vehicles.

Methods in accordance with the present teaching address the aforementioned problems by providing a license plate having one of more of the following features, among others:
  quick, damage-free mounting to a vehicle via an adhesive substrate, avoiding, in some cases, the need for mounting hardware;
  tamper-resistance via optically transparent protective outer laminating layer;
  embedded devices for wireless communication;
  unique branding, security, tracking, identification, and authentication through the use of hologram and watermarking features;
  database retrieval feature via QR codes;
  improved safety through the use of soft, pliable materials; and
  improved aesthetics; and
  theft-deterrence via security scoring features.

Some embodiments in accordance with the present teachings provide a vehicular license plate that has nine or fewer layers as a function of the features incorporated therein. The vehicular license plate is pliable, adhesive, and may be made to any size specification. Even when the plate includes all nine layers, it is quite thin, typically less than 1/32 of inch. When applied to a vehicle, the license plate will appear flush on the vehicle's surface, following the natural contours thereof.

Some embodiments of the invention provide a license-plate assembly, the license-plate assembly including:
  a flexible license plate having:
    (i) a retroreflective film having a first side and a second side, the first side having a pressure-sensitive adhesive applied thereto,
    (ii) a licensing-information layer, the licensing-information layer consisting of ink, at least some of which ink is deposited in the form of alphanumeric characters on the second side of the retroreflective film, the alphanumeric characters providing vehicle license information, and
    (iii) a protection layer overlying the licensing-information layer and retroreflective film, wherein the protection layer comprises a film that is optically transparent;
  a backing having a first side and a second side, wherein the flexible license plate is disposed on the second side of the backing, the backing extending beyond a perimeter of the flexible license plate and, in so extending, defining a marginal region; and
  plural indices disposed within the marginal region, the indices being symmetrically spaced about respective horizontal and vertical center points of the flexible license plate, the indices facilitating alignment of the flexible license plate during installation thereof on a motor vehicle.

Some embodiments of the invention provide a license-plate assembly comprising a flexible license plate, the flexible license plate having plural layers, including a licensing-information layer, the licensing-information layer consisting of ink, at least some of which ink is deposited in the form of alphanumeric characters on an underlying one of the plural layers, the alphanumeric characters providing license information; and a backing, wherein the flexible license plate is disposed on the backing, the backing extending beyond a perimeter of the flexible license plate and, in so extending, defining a marginal region, wherein plural indices are disposed within the marginal region, the indices being symmetrically spaced about respective horizontal and vertical center points of the flexible license plate, the indices facilitating alignment of the flexible license plate during installation thereof on a motor vehicle.

Some embodiments of the invention provide a method for making a license-plate assembly, the method comprising providing a retroreflective film disposed on a backing; printing alphanumeric characters within a first rectangular region of the retroreflective film, the alphanumeric characters providing vehicle license information; printing indices within a second region of the retroreflective film, wherein second region surrounds the first region; and disposing an optically transparent protection layer over the licensing-information layer and retroreflective film.

Summarizing, a license-plate assembly, as depicted and described, comprises: (i) a backing, and (ii) a flexible license plate, the license plate having a retroreflective layer, a licensing-information layer disposed on the retroreflective layer, and a protection layer. Embodiments of the license-plate assembly may further comprise at least one of the following features, in any (non-conflicting) combination, among other features disclosed herein:

Alignment indices disposed in a marginal regional surrounding the flexible license plate, Badging appearing between the alignment indices, the badging including one or more of branding, use instructions, regulatory information, etc.;

Badging disposed on a back surface of the backing;

A supplemental information layer including supplemental-information bearing features, including one or more holograms, and/or one or more watermarks, and/or one or more QR codes;

A communications layer including one or more wireless communication devices;

One or more anti-alteration/barrier layers, used to detect attempted alterations to the supplemental-information bearing features, and/or to create visual, mechanical and/or electrical barriers between various layers of the flexible license plate;

Security scoring;

A mounting layer with a surface treatment that increases the static coefficient of friction between the mounting layer and a dashboard of a car; and A plate holder for mounting the flexible license plate on certain regions of a vehicle.

BRIEF DESCRIPTION OF THE DRAWINGS

FIG. 2A depicts a license-plate assembly in accordance with the illustrative embodiment.

FIG. 2B depicts removal of the license plate from the license-plate assembly.

FIG. 3A depicts an "exploded" view of a license-plate assembly in accordance with a first illustrative embodiment, showing a 4-layer version thereof.

FIG. 3B depicts a front view of the license-plate assembly of FIG. 3A.

FIGS. 4A and 4B depict a further embodiment of the license-plate assembly of FIG. 2A.

FIG. 6A depicts an "exploded" view of a license-plate assembly in accordance with a third illustrative embodiment, showing an 8-layer version thereof.

FIG. 6B depicts a front view of the license-plate assembly of FIG. 6A.

FIG. 7A depicts an "exploded" view of a license-plate assembly in accordance with a fourth illustrative embodiment, showing a 9-layer version thereof.

FIG. 7B depicts a front view of the license-plate assembly of FIG. 7A.

FIGS. 7C-7E depict a front view of respective alternative embodiments of the license-plate assembly of FIGS. 7A and 7B.

FIG. 9A depicts some steps of a process by which license plate 110 is installed on the front of a vehicle.

FIGS. 10A-10C depict a plate holder for use with license plate 110 in accordance with the present teachings.

FIG. 11A through 11I depicts a process by which license plate 110 is installed on the back of a vehicle.

DETAILED DESCRIPTION

Figure 1A:
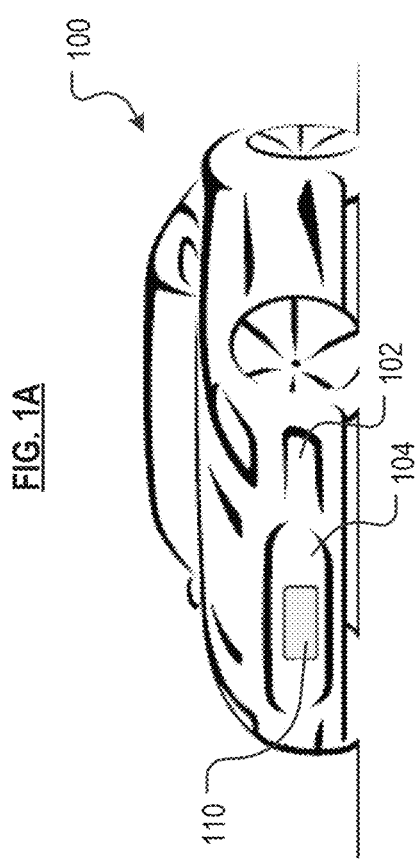
FIGS. 1A and 1B depict a license plate in accordance with the illustrative embodiment of the present invention adhered to the front and rear of an automobile, respectively.

Reference to the "left side" or the "right side" of an article depicted in the accompanying drawings is to be understood as being from the "perspective" of the article, not the viewer. Reference to "up", "above", "down", "below", "left", "right", "front", "top", "bottom" or "back" in conjunction with a drawing refers to a viewer's perception of these directions when viewing the drawing, unless otherwise specified.

Figure 1B:
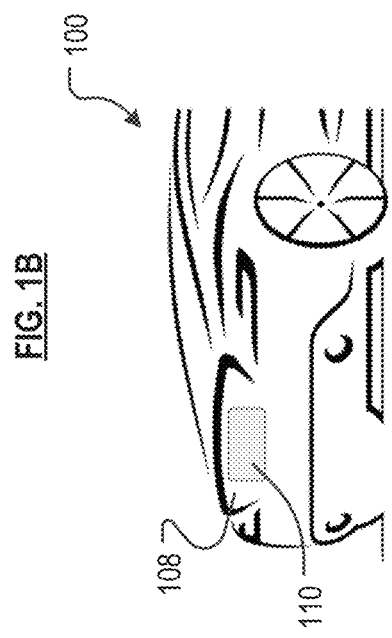

FIG. 1A depicts motor vehicle 100 having license plate 110 in accordance with the present teachings adhered to central region 104 of front bumper 102. FIG. 1B depicts a rear view of motor vehicle 100, with plate 110 disposed in central region 108, typically located above the rear bumper. License plate 110 is sufficiently flexible so that it can readily conform to the contours of a curved surface of motor vehicle 100 to which it is adhered. In some embodiments, plate 110 is adhered to a plate holder (not depicted; see FIGS. 10A-10C, etc.), which is in turn attached to the rear of the motor vehicle. All states require a license plate, such as plate 110, to be mounted at the rear of a motor vehicle; some states require a license plate, such as plate 110, to be mounted at both the rear and the front.

FIGS. 2A and 2B depict license-plate assembly 240, including plate 110, marginal region 211, and backing 212. In the illustrative embodiment, the backing is a coated paper, such a polyethylene-coated paper, discussed further in conjunction with layer 324 of FIG. 3A. Backing 212 protects plate 110 during transport and handling, which includes preventing dirt and debris from coming in contact with the adhesive back surface of plate 110. Backing 212 is removed during the installation of plate 110 on a car, and is disposed of thereafter. Other materials, as will occur to those skilled in the art in view of the present teachings, may suitably be used as backing 212.

Plate 110, which is flexible, comprises plural layers of material; usually a minimum of three to a maximum of seven layers, as described later in this specification. The overall thickness of plate assembly 240 is typically, but not necessarily, within the range of about $\frac{1}{64}^{th}$ of an inch (0.4 millimeters) to about $\frac{1}{32}^{nd}$ of an inch (0.8 millimeters). The variation in thickness of plate assembly 240 is primarily due to the aforementioned possible variation in the number of layers of material composing plate 110, as well as variation in the thickness of the individual layers. As described later in this specification, the variation in the number of layers is a function of the features that are included in plate 110.

Referring now to FIG. 2B, for installation on a vehicle, etc., plate 110 must be separated from backing 212. The undersurface of the bottommost layer of plate 110 comprises an adhesive, such as a pressure sensitive adhesive (PSA), and separation from backing 212 involves peeling back one of the corners of plate 110, and continuing to peel until it is free from backing 212.

The installation process is facilitated by the presence of marginal region 211. During fabrication, one or more cuts are made (depending on the cutting apparatus) through the various layers composing plate 110, resulting in marginal region 211. Importantly, backing 212 is not cut during cutting operations. This enables plate 110 to be readily peeled from backing 212. Additional details of the manner in which plate 110 is installed on the front and back of an automobile are provided later in this specification in conjunction with FIGS. 9A/9B, and FIGS. 11A-11J, respectively. Furthermore, as described later in this specification (see, e.g., FIGS. 4A and 4B), in some embodiments, alignment indices and other information is provided in marginal region 211.

FIGS. 3A/3B, 5A/5B, 6A/6B, and 7A/7B depict four specific embodiments (i.e., plate 310, plate 510, plate 610, and plate 710) of plate 110, which differ by the number of layers of material (and hence the functionality) included in plate 110. Moreover, FIGS. 7A/7B, and FIGS. 7C, 7D, and 7E depict several variations of a security feature for use in conjunction with embodiments of the invention. For convenience, reference to "plate 110," "marginal region 211," and "plate assembly 240" is understood to refer to any and all specific embodiments thereof, unless otherwise indicated.

Turning now to the specifics of several embodiments of plate 110, FIGS. 3A and 3B depict respective "expanded" and front views of license-plate assembly 340 in accordance with an illustrative embodiment. License-plate assembly 340 includes four flexible layers, which includes backing 212 and three layers 324, 326, and 328 that collectively form plate 310. As described further below, layers 324, 326, and 328 are cut, thereby creating marginal region 311 (which includes portions of all three of those layers).

Layer 324 is a retroreflective, vinyl-based film, including a pressure sensitive adhesive, that is disposed on polyethylene-coated paper. Although layer 212 is depicted as a separate layer, in the illustrative embodiment, it is actually the polyethylene-coated paper portion of layer 324. Materials suitable for use as layer 324 (including backing 212) include, without limitation, Scotchlite™ brand reflective film, commercially available from 3M company. Layer 324, which is of course pliable, imbues plate 310 with reflective properties.

Layer 326, which is referred to as a "licensing-information layer," is an ink printing layer; that is, this layer is itself the ink that is directly applied to layer 324. The ink that is embodied as licensing-information layer 326 provides the art work and alphanumeric characters of plate 310. In addition to creating alphanumeric characters, etc., ink is additionally applied to marginal region 325 of layer 324. The ink applied in marginal region 325 provides alignment indices for installation operations, as well as other information, as described in further detail in conjunction with FIGS. 4A and 4B.

Inks serving as licensing-information layer 326 are preferably formulated for ultra-violet (UV) rejection, fade resistance, color retention, pliability retention, and crack-resistance. The ink, which is typically a solvent-based ink, is a combination of a carrier fluid, pigment, and resin, and is selected for desired color, graphical, and environmental requirements. Licensing-information layer 326 is typically applied using large-scale digital printing machines. Ink suitable for use as layer 326 includes, for example and without limitation, UltraChrome® GS3 solvent ink, commercially available in a variety of colors from Epson® and 3M™ companies. It is notable that ink used for this layer is not a UV-curable ink. The inventors have found that the performance characteristics of solvent inks are superior than UV-curable inks for the purposes of layer 326. However, UV-curable inks are used in some embodiments of other layers having other purposes than layer 326, such as certain layers present in the embodiments of plates 510, 610, and 710 described later in this specification.

Protection layer 328 is the topmost layer of plate 310, and is applied over licensing-information layer 326. Layer 328 is an optically transparent (in at least visible wavelengths), hydrophobic, weatherproof, UV-resistant film that encapsulates underlying layers 326 and 324 of plate 310, creating a permanent seal. In various embodiments, protection layer 328 can have a gloss finish, a satin finish, or a matte finish. Layer 328 may vary in thickness based on application-specific considerations, and/or desired flexibility or handling properties, but is typically in the range of 1 to 4 mils (0.025 to 0.10 mm). Materials suitable for use as protection layer 328 include, without limitation, Scotchcal™ brand adhesive vinyl film, which is commercially available from 3M™ Company.

The various layers of nascent plate 310 are positioned directly over the preceding layer(s); that is, the perimeters of the various layers align (with the exception of layer 326; ink is not necessarily printed over the full extent of underlying layer 324.) The assemblage of layers is placed in a cutting device, such as a digitally-controlled plotter/cutter, and layers 328, 326, and 324 (but not the backing 212) are cut such that marginal region 311 results. Marginal region 311 is the specific embodiment of marginal region 211 (FIG. 2B) for plate assembly 340. For example, the plural layers are cut along right and left cut lines C1 and C2, as well as along cut lines (not depicted) sited near the lower and upper edges of the assemblage of layers. The result of this cutting operation is license-plate assembly 340, as depicted in FIG. 3B. As depicted in these figures, backing 212 remains uncut to facilitate removal of plate 310 at the time of plate installation on a vehicle.

Figure 8B:
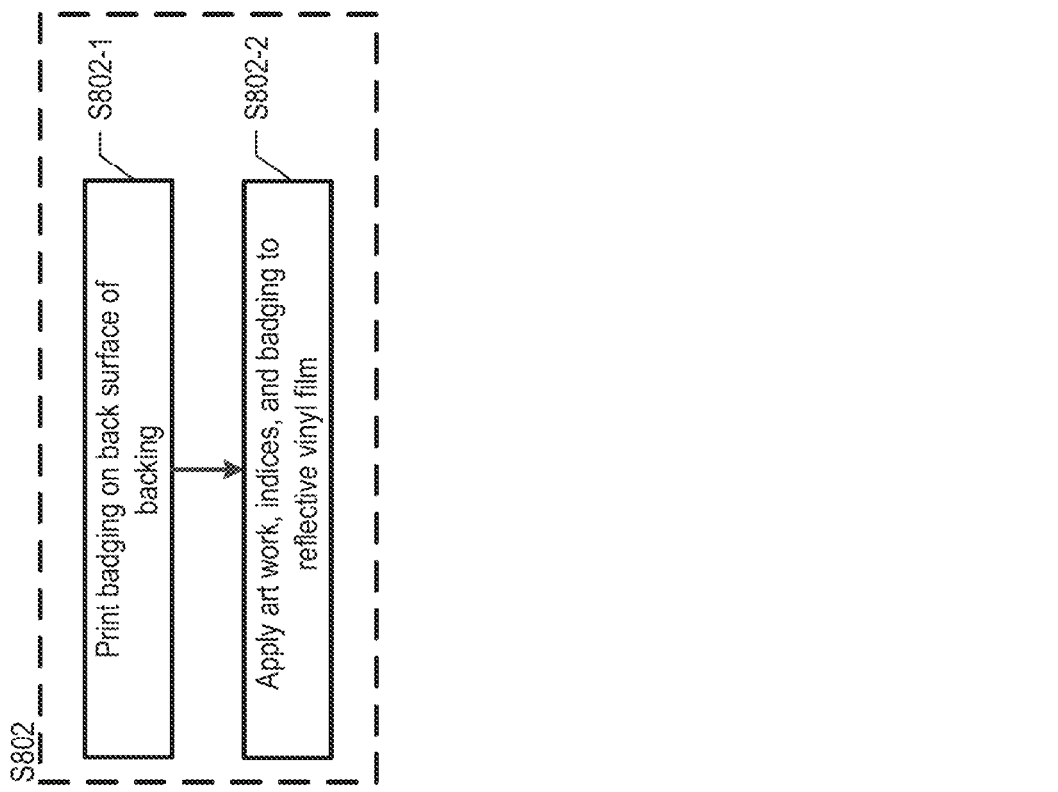
FIGS. 8A-8C depict manufacturing processes for embodiments of the license-plate assembly described herein.
Figure 8A:
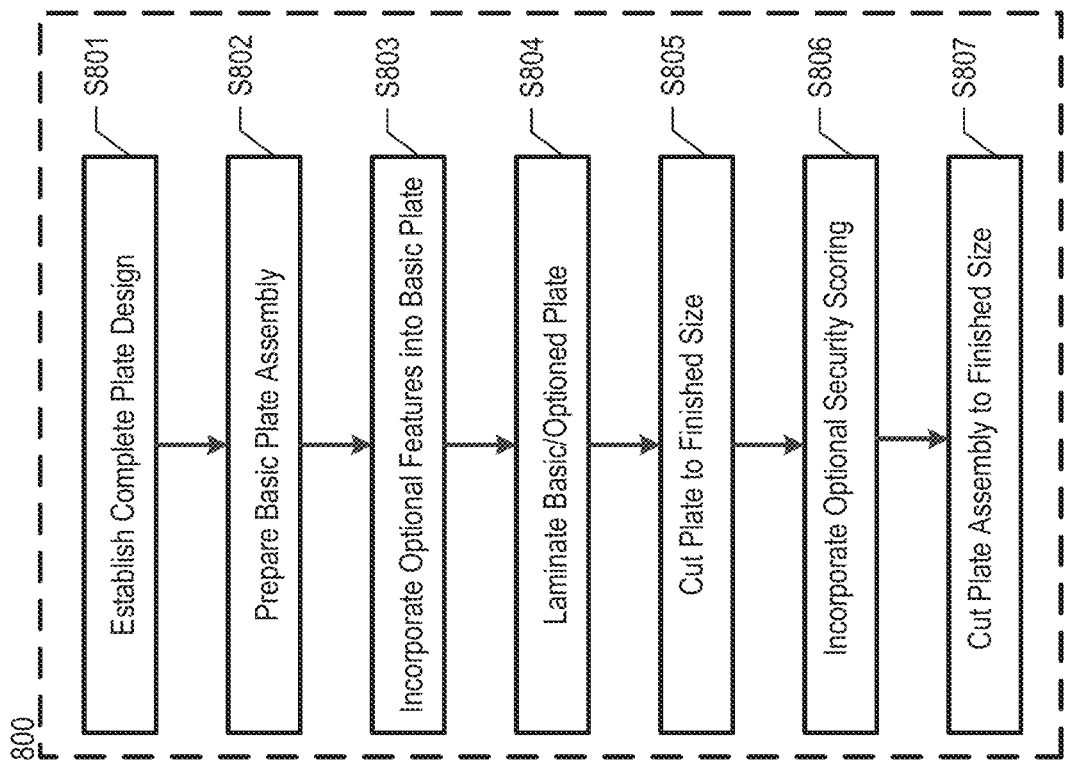
Figure 8C:
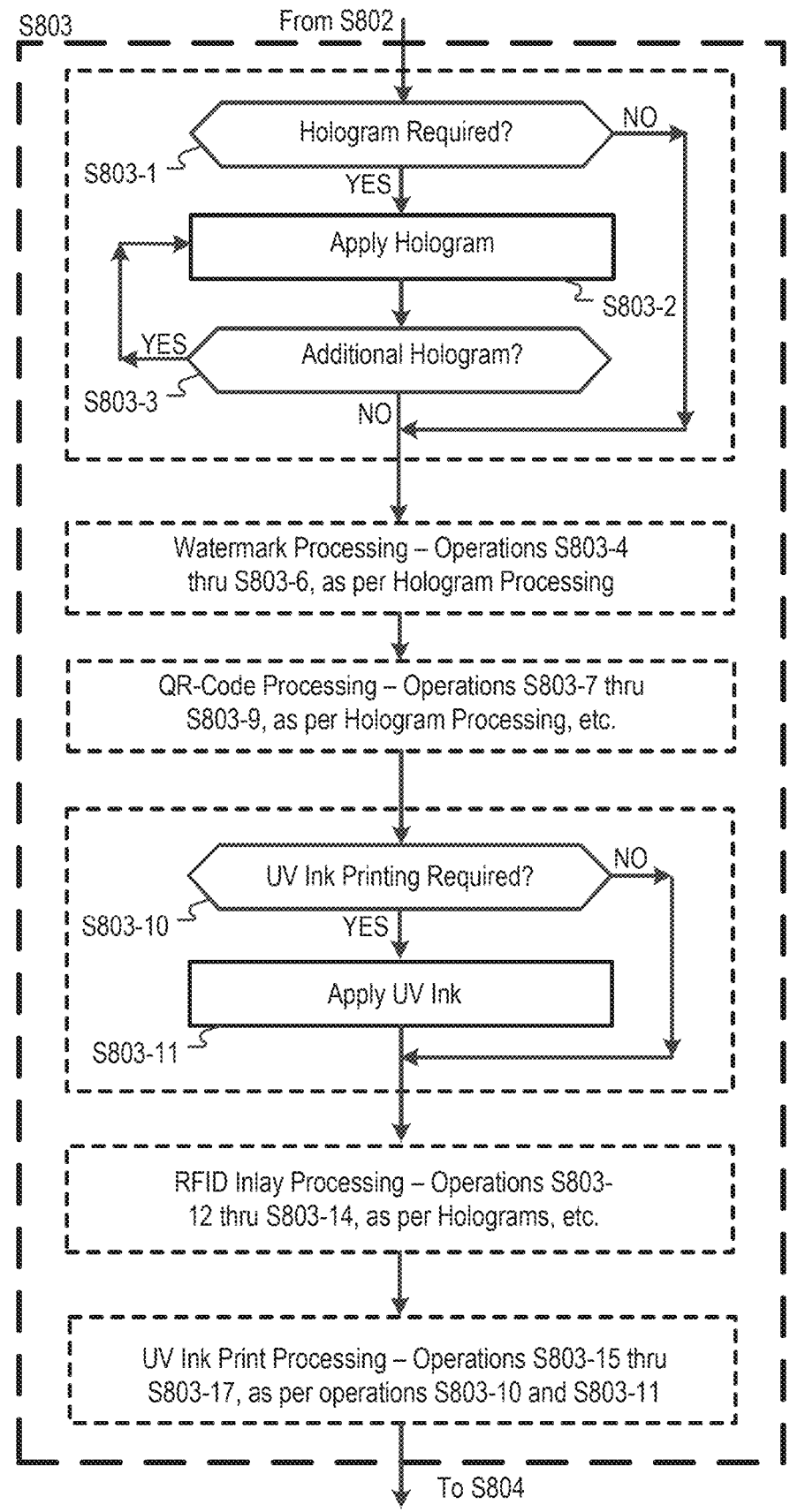

Additional details about the fabrication of various embodiments of plate 110 (e.g., plates 310, 510, 610, 710, etc.) are provided in conjunction with FIGS. 8A-8C.

FIGS. 4A and 4B depict the aforementioned alignment indices and other information that is included on some embodiments of a license-plate assembly in accordance with the present teachings.

FIG. 4A depicts a front view of license-plate assembly 340, sans plate 310. Backing 212 is visible within the perimeter defined by the inside edge of marginal region 311. Marginal region 311 extends to perimeter of underlying backing 212 (see FIG. 4B); its inner perimeter is essentially equivalent to the outer perimeter of plate 310; the inner perimeter falls just to the outside of the location of cut line(s), previously discussed. In some embodiments, marginal region 311 has a width of about ½ inch on each side. Since it remains uncut, backing 212 will be about 1 inch larger in both width and height than plate 310. For example, for a United States automotive license plate measuring 12 inches wide and 6 inches in height, backing 212 would have dimensions of about 13 inches in width and 7 inches in height.

Plural indices 416 appear on marginal region 311. As previously discussed, these indices are printed on layer 324 of license-plate assembly 340. Indices 416 facilitate visual alignment of plate 310 during the installation process (see, e.g., FIGS. 9A and 9B, etc.). In the illustrative embodiment, indices 416 are displayed in equal quantities and with symmetrical spacing from the respective horizontal and vertical center points of license-plate assembly 340. In the illustrative embodiment, marginal region 311 includes twenty indices, five per side, although the number of indices can vary based on design objectives and/or plate size.

Branding 418, instructions 420, other information 422 (e.g., regulatory information, etc.), hereinafter collectively referenced as "badging," can be located at arbitrary locations between indices 416.

FIG. 4B depicts back surface of backing 212. As desired, in addition to appearing on marginal region 311, badging can also or alternatively appear on back surface of backing 212. As described in further detail later in this specification, any badging that appears on the back surface of backing 212 is typically printed thereon before assembling the various layers composing plate 310. As previously noted, indices and badging are printed on layer 324 at the appropriate time as the various layers of any embodiment of plate 110 (e.g., plate 310, etc.) is being assembled. It is to be understood that although the printing of indices 416 and badging is illustrated for license-plate assembly 340, it is applicable to all embodiments of license-plate assembly (i.e., applicable to the generic "license-plate assembly 240" and the generic "plate 110").

Figure 5A:
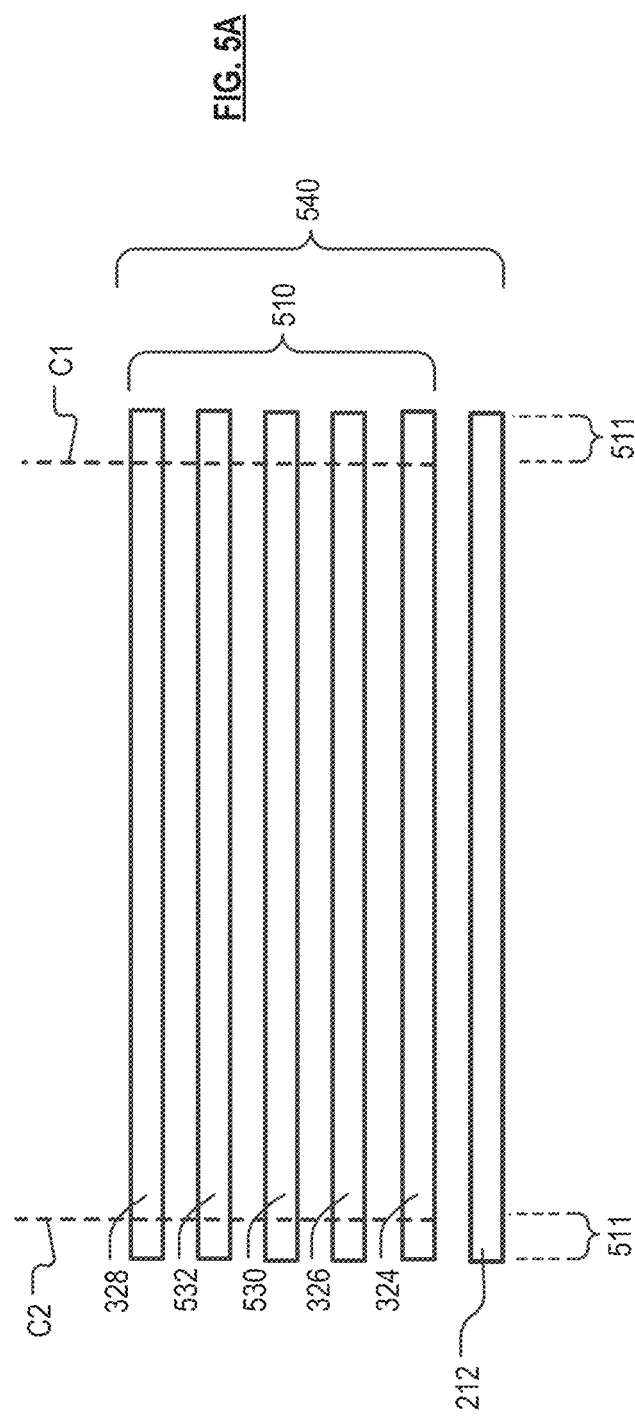
FIG. 5A depicts an "exploded" view of a license-plate assembly in accordance with a second illustrative embodiment, showing a 6-layer version thereof.
Figure 5B:
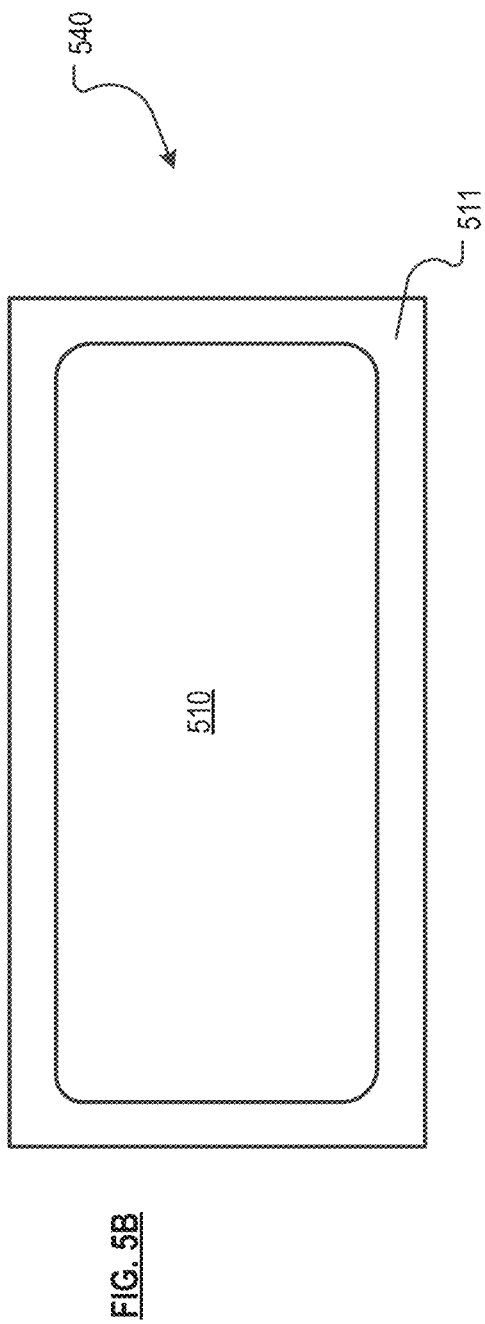
FIG. 5B depicts a front view of the license-plate assembly of FIG. 5A.

FIGS. 5A and 5B depict respective "expanded" and front views of license-plate assembly 540 in accordance with an illustrative embodiment. License-plate assembly 540 includes the four flexible layers of license-plate assembly 340, as well as two additional layers 530 and 532. The two additional layers 530 and 532 are sandwiched between top layer 328 and layer 326, the ink-printing layer.

Layer 530 is a "supplemental-information layer" that includes supplemental-information-bearing features. These features include one or more holograms, and/or one or more watermarks, and/or one or more QR codes which, in the illustrative embodiment, are disposed on layer 326. In some alternative embodiments, supplemental-information layer 530 is disposed on layer 324. The choice of the immediately underlying layer is a function of graphical design requirements.

Supplemental-information layer 530 provides any one or more of a variety of functions, including, without limitation:
- use as a security feature or authentication feature (e.g., increasing protection against plate theft; with the inclusion of certain vehicle information, layer 530 can provide authentication of the primary vehicle identification; preventing manipulation, fraud, copying, etc.);
- use as a tracking feature;
- use as a branding feature (e.g., include a logo or other information);
- use as a database retrieval feature;
- use as an identification feature.

Additionally, because the plate 110 is designed so that, if desired, it can be removed from a motor vehicle, the various supplemental-information-bearing features can be used to detect illicit/improper reuse of plate 110.

As indicated above, in some embodiments, the supplemental-information-bearing feature is one or more holograms. In some embodiments, the hologram is created by ink printing on a metallized, high-gloss polyester or vinyl film. Thus, when the supplemental-information-bearing feature is implemented as a hologram, layer 530 includes the aforementioned metallized film, in addition to ink. Metallized film material suitable for use as a sublayer in conjunction with layer 530 include, without limitation, SF 100 films available from Avery Dennison Company.

Additionally or alternatively, the supplemental-information-bearing feature can be one or more watermarks via, for example, ink printing to create an identifying image or pattern, which becomes visible under various lighting conditions.

Additionally or alternatively, supplemental-information-bearing feature can be one or more QR codes via, for example, ink printing to create the characteristic 2D form. The QR code can be used to encode a variety of information, which may or may not be encrypted, including various authentication/security/background information concerning the vehicle bearing the plate, the driver, etc.

The holograms, watermarks, and QR codes can be ink printed using UV-curable ink, such as is commercially available from Mimaki USA, Inc., and others. Alternatively, the holograms, watermarks, and QR codes can be ink printed using solvent-based inks, such as UltraChrome® GS3 solvent ink, commercially available in a variety of colors from Epson® and 3M™ companies.

As previously mentioned, layer 530 comprises any one or more of the aforementioned supplemental-information-bearing features. To the extent that supplemental-information layer 530 includes one or more holograms, in addition to watermarks and/or QR codes, the particular region of layer 530 that embodies the hologram(s) must include the aforementioned metallized film.

As one skilled in the art will appreciate, the ink embodying the supplemental-information-bearing features of layer 530 may "bleed" into marginal region 511. Layer 530 may not be present in some embodiments, and, as a consequence, is an optional feature that is present in some but not necessarily all embodiments of the invention.

Layer 532, which is referred to as an "anti-alteration/barrier layer," covers at least some of hologram(s), and/or watermark(s), and/or QR codes implemented as supplemental-information layer 530 to prevent undetected alteration of such features (i.e., to ensure that any attempted alteration is detectable). In the illustrative embodiment, layer 532 is implemented as a UV-curable ink-printing layer; that is, this layer is UV-curable ink that is directly applied to the supplemental-information-bearing features of layer 530. In some embodiments, the UV-curable ink, and hence layer 532, is optically transparent. UV-curable ink suitable for use as layer 532 may be the same brand/type of UV-curable ink that is used for layer 530. Although UV-curable ink is the preferred material for use as layer 532, to the extent future developments permit, other types of ink/materials may be used for layer 532.

In some embodiments, layer 532 is deposited at specific areas (e.g., strategically determined to prevent undetected alteration, etc.) on layer 530. In some other embodiments, layer 532 is deposited over the full extent of layer 530 with appropriate bleed.

Furthermore, in some embodiments, layer 532 is used to create, as appropriate, specific visual, mechanical and/or electrical barriers from preceding or subsequent layers.

The presence of anti-alteration/barrier layer 532 is contingent upon design and/or performance requirements and is an optional feature present in some but not necessarily all embodiments of the invention. However, to the extent that layer 530 is present, layer 532 is advantageously, but not necessarily present.

Like the embodiment depicted in FIGS. 3A and 3B, layer 328 is the uppermost layer of plate 510 and serves to protect the underlying layers.

As in the embodiment of FIGS. 3A and 3B, the various layers of nascent plate 510 are positioned directly over one another. The assemblage of layers is placed in a cutting device, and are cut, resulting in license-plate assembly 540, as depicted in FIG. 5B. More particularly, the cutting creates plate 510 and marginal region 511.

FIGS. 6A and 6B depict respective "expanded" and front views of license-plate assembly 640 in accordance with an illustrative embodiment. License-plate assembly 640 includes the six flexible layers of license-plate assembly 540, as well as two additional layers 634 and 532-2. The two additional layers 634 and 532-2 are sandwiched between top layer 328 and layer 532-1 (identified as layer 532 in FIG. 5A).

Layer 634, referred to herein as a "communications layer," comprises a wireless communication device, such as a passive RFID inlay, well known in the art. A variety of RFID technologies are available, including low frequency (LF), high frequency (HF), ultra-high-frequency (UHF), the latter two having a thickness of about 10 mils (0.25 mm) as implemented in RFID inlays. RFID inlays suitable for use as communications layer 634 include, without limitation, Dog-Bone™ brand "dry" (i.e., lacking adhesive backing), passive, UHF RFID inlay, commercially available from Smartrac N.V. In conjunction with this specification, it is within the capabilities of those skilled in the art to select an appropriate RFID inlay or other communications device suitable for use in conjunction with embodiments of the invention.

The location of the RFID inlay (or other communications device) relative to the other layers of nascent plate 610 is a function of the mounted orientation of plate 110, among any other requirements and variables. In some embodiments, a single RFID inlay is used. In some other embodiments, plural RFID inlays may be used to create layer 634, wherein such plural inlays may utilize the same or differing RFID technology from one another to achieve a specific functionality. The presence of communications layer 634 is contingent upon design and/or performance requirements and is an optional feature present in some but not necessarily all embodiments of the invention.

In the illustrative embodiment, layer 532-2 is an anti-alteration/barrier layer like 532-1, implemented as a UV-curable ink-printing layer (i.e., this layer is UV-curable ink that is directly applied to layer 634). Layer 532-1 provides the same functionality as layer 532 of plate 510. Layers 532-1 and 532-2 comprise the same material as layer 532 of the embodiment of FIGS. 5A and 5B.

In this illustrative embodiment, the UV-curable ink embodied as layer 532-2 covers at least some portions of the RFID inlay(s) composing layer 634, to prevent tampering. In some other embodiments, layer 532-2 is deposited on the full extent of layer 634 with appropriate bleed. In addition to the aforementioned functionality, layer 532-2 serves to create, as appropriate, specific visual, mechanical and/or electrical barriers from preceding or subsequent layers. The presence of layers 634 and 532-2 is contingent upon design and/or performance requirements and are, as such, optional features present in some but not necessarily all embodiments of the invention.

Like the previously described embodiments, layer 328 is the uppermost layer of plate 610 and serves to protect underlying layers.

Like the previously described embodiments, each layer of nascent plate 610 is positioned directly over the preceding layer. The assemblage of layers is placed in a cutting device and is cut (with the exception the backing layer), resulting in license-plate assembly 640, as depicted in FIG. 6B. More particularly, the cutting creates plate 610 and marginal region 611.

The holograms, watermarks, QR codes, and wireless communication devices shown in the illustrative embodiments appear in certain layers within plate 110. Depending on the choice of materials for other layers of plate 110, the location of the hologram, watermark, QR-code, and communications-device layers may differ from what is shown. For example, depending on the nature of the ink used, the watermark might need to be closer to the surface of plate 110 for better visibility. And the particular type of wireless technology employed, and the nature of the antenna design, may dictate that the communication device layer be in a different location in plate 110 than depicted in the figures. Moreover, depending on the wireless technology used, additional layers of materials may be added to plate 110 to improve communications performance.

FIGS. 7A and 7B depict respective "expanded" and front views of license-plate assembly 740 in accordance with an illustrative embodiment. This embodiment adds two features—security scoring 742 and layer 738—to license-plate assembly 640. In other embodiments, these two features are combined with other embodiments of the license-plate assembly, such as license-plate assemblies 340 or 540.

Security scoring 742 comprises a plurality of precise incisions, created from a digitally-controlled plotter/cutter or similar device. In the illustrative embodiment, these incisions penetrate all but two layers of the finished license-plate assembly 740. Specifically, the bottommost layer—backing 212—, and topmost layer—layer 738—, are the only two layers which are not penetrated by the incisions of security scoring 742. All other layers are fully penetrated. Where applicable, security scoring 742 must avoid severing portions of any of the RFID inlays of layer 634.

Uppermost layer 738 is a "transfer mask," which is required in conjunction with security scoring 742. Layer 738 holds the various layers of plate 110 together while the plate is being installed on a vehicle. Layer 738 is optically transparent so that an installer can establish and maintain visual alignment during the installation process. Upon completion of the installation process (see, e.g., FIGS. 9B, 10B), layer 738 is removed.

As depicted in FIG. 7A, layer 738 is not cut along cut lines C1 and C2 like the various layers composing plate 710 (or any other embodiment of the plate). As such, it would be difficult, during installation, to remove layer 738 from plate 710 if marginal region 611 were physically present, as in the previously described embodiments of the license plate assembly. As such, for embodiments in which security scoring is used, the marginal region of each layer composing plate 710 is removed prior to placing layer 738 on plate 710.

In various embodiments of security scoring 742, the shape, quantity, and orientation of the incisions may vary. For example, and by way of illustration, not limitation, four different implementations of security scoring 742 are depicted in FIGS. 7B through 7E.

In FIG. 7B, security scoring 742 of plate 710 comprises a plurality of vertically oriented wavy incisions. In FIG. 7C, security scoring 742A of plate 710A comprises a plurality of horizontally oriented wavy incisions. In FIG. 7D, security scoring 742B of plate 710B comprises a plurality of vertically oriented linear incisions. And security scoring 742C of plate 710C of FIG. 7E comprises a plurality of horizontally oriented linear incisions.

Other implementations of security scoring 742, as will occur to those skilled in the art in light of the present specification, may suitably be used in conjunction with embodiments of the invention. And, in light of the teachings of this specification, other types of security features, as will occur to those skilled in the art, may be used in conjunction with, or as an alternative to, security scoring 742.

The presence of security scoring 742 and layer 738 (i.e., the transfer mask) are contingent upon design and/or performance requirements and are therefore optional features present in some but not necessarily all embodiments of the invention.

FIGS. 8A through 8C depict, via flow charts, method 800, which is an embodiment of a method for fabricating plate 110.

Referring now to FIG. 8A, in task S801, the design of license-plate assembly 240 is established. The design covers all aspects of the license-plate assembly, including branding, logos, hologram, watermark, QR-code, plate design, security scoring, plate cutout, RFID inlay placement, sizing, etc. This is typically performed using computer software, such as Adobe Illustrator, running on a desk top computer, lap top computer, tablet, or the like.

In task S802, the "basic" plate assembly 340 is fabricated. The basic plate is the embodiment depicted in FIGS. 3A and 3B, although at this point in the method, layer 328—the overlying protective layer—is not yet part of the stack of layers composing the nascent plate assembly. Task S802 is described in further detail in conjunction with FIG. 8B.

In task S803, any optional features, which are typically but not necessarily intralayer features (i.e., they are contained within a single layer, although a second layer may be associated with the feature in the single layer, such as to protect the feature) are added. Such optional features include, for example and without limitation, the hologram(s), and/or watermark(s), and/or QR code(s) (and accompanying first anti-alteration/barrier layer of license-plate assembly 540, and the RFID inlay(s) (and accompanying second anti-alteration/barrier layer) of license-plate assembly 640.

In task S804, a protective layer (i.e., layer 328) is applied the assemblage of layers composing nascent plate 110. Layer 328 seals underlying layers. In task S805, nascent plate 110 is cut to its final size. This task, in which all layers other than backing 212 are cut, results in the formation of marginal region 211, as previously discussed.

In task S806, optional security scoring is added, as desired. If security scoring is applied to the assemblage of layers, an additional layer, layer 738—the transfer mask—is applied on layer 328. However, before adding layer 738, the "marginal" area is removed (compare FIG. 6A, marginal region 611 with FIG. 7A). Finally, in task S807, nascent license-plate assembly 240 is cut to a desired finished size. The individual plate assemblies are then packaged and ready for shipping.

FIG. 8B provides an embodiment of a method for accomplishing task S802; that is, preparing the basic plate assembly.

In task S802-1, badging (i.e., branding, instructions, regulatory information) is printed on the back surface of backing 212. In embodiments in which backing 212 and layer 324 are provided as a single layer of material (e.g., a retroreflective, vinyl-based film, including a pressure sensitive adhesive, which is disposed on polyethylene-coated paper, etc.), a bulk roll of such material is fed to a printing device for this purpose. In some other embodiments, backing 212 and layer 324 are provided as two separate layers of material. In such embodiments, a bulk roll of backing 212 is fed to a printing device, and badging is printed to the back surface of the backing. A separate roll of layer 324 (implemented as vinyl film only, not backing), is laid over the top surface of backing 212 and adhered thereto.

In task S802-2, layers 212/324 are fed to an ink-printing device to apply layer 326, the licensing-information layer, to layer 324.

FIG. 8C provides an embodiment of a method for accomplishing task S803; that is, incorporating optional features into the basic plate assembly.

In task S803-1, query if a hologram is required. If so, the hologram (i.e., supplemental-information layer 530, including metallized film, FIG. 5A) is installed on layer 326 (ink printing layer) at task S803-2. Query, at task S803-3, whether further holograms are required. If "yes," install a further hologram on layer 326. If the response to the queries at tasks S803-1 or S803-3 is "no," proceed to optional watermark processing, tasks S803-4 to S803-6.

The tasks for optional watermark processing are analogous to those of optional hologram processing. Watermarks are applied to layer 326, as desired, in addition to or as an alternative to holograms. If watermarks are not required, or once they have been applied, proceed to optional QR-code processing, tasks S803-7 to S803-9.

The tasks for optional QR-code processing are analogous to those of optional watermark processing. QR codes are applied to layer 326, as desired, in addition to or as an alternative to holograms and/or watermarks. If QR codes are not required, or once they have been applied, proceed to ink-printing operations S803-10 and S803-11, to create an anti-alteration/barrier layer for layer 326.

In the illustrative embodiment, ink printing, such as with UV-curable ink, may be applied if one or more holograms, and/or one or more watermarks, and/or one or more QR codes have been applied to layer 326, and/or if a requirement exists (e.g., for a mechanical, electrical, design barrier, etc.) for the RFID layer. If neither holograms, watermarks, nor QR codes have been applied, processing proceeds directly to optional RFID inlay processing, tasks S803-12 through S803-14. As previously noted, if suitable alternatives to UV-curable ink become available (i.e., provide the requisite functionality and are otherwise acceptable), such materials may be used in place thereof.

The tasks for RFID-inlay processing (or other communications devices) are analogous to those of hologram, watermark, and QR-code processing (i.e., the same simple looping arrangement of tasks S803-1 through S803-3). If one or more RFID inlays are applied, UV-curable ink or a suitable alternative may be applied to the layer of RFID inlay(s), per tasks S803-15 through S803-17. As such, if hologram(s), and/or watermark(s), and/or QR-codes have previously been applied, the ink applied to the communications layer creates a second anti-alteration/barrier layer.

After completing task S803, such as by applying one or more optional layers described via tasks S803-1 through S803-17, or not applying any optional layers, proceed to task S804 (FIG. 8A).

Figure 9B:
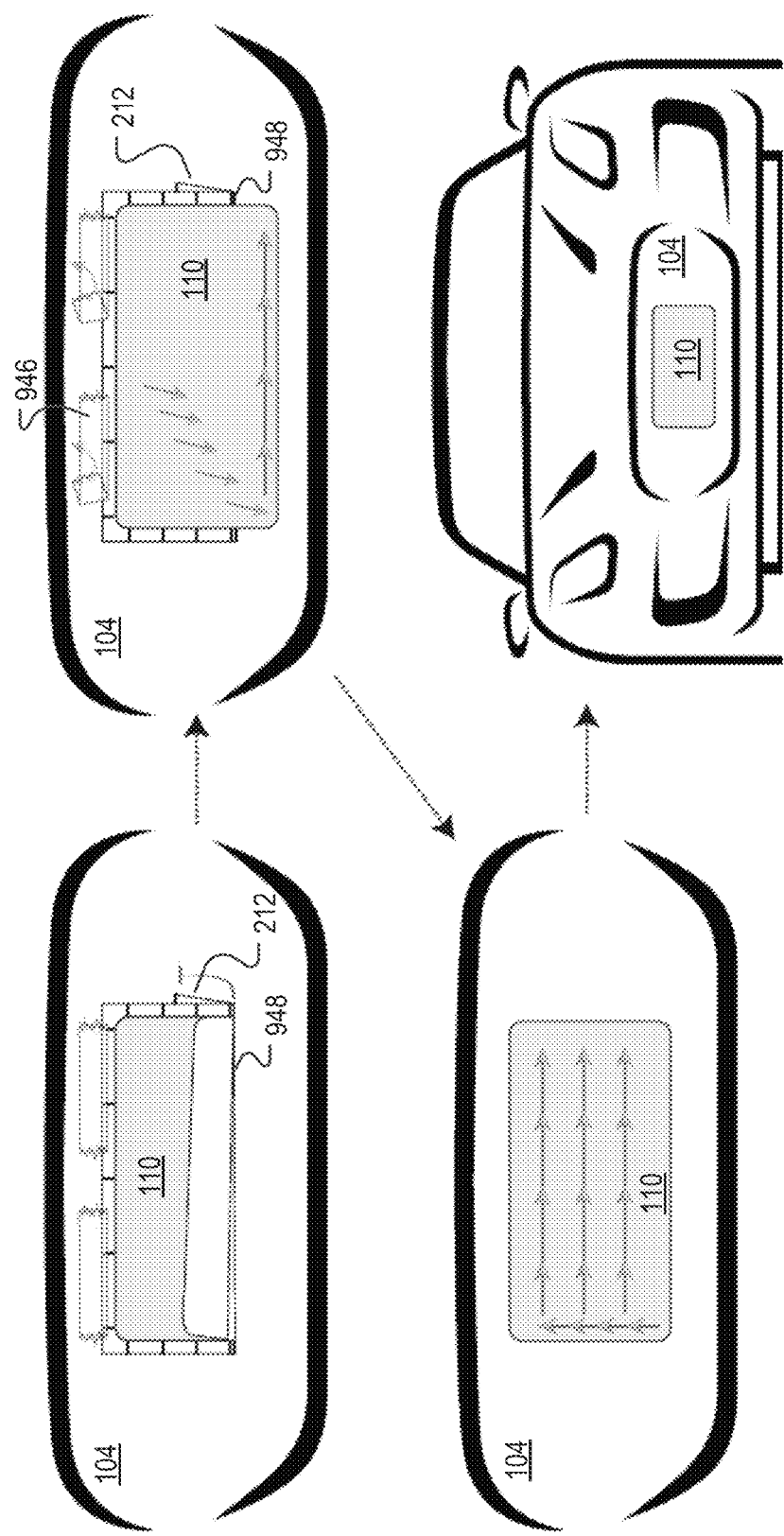
FIG. 9B depicts the remaining steps of the process of FIG. 9A.

FIGS. 9A and 9B depict a sequence of operations by which license plate 110 is dry installed at the front of a motor vehicle. For clarity, all visual indications normally present on plate 110 are not depicted in FIGS. 9A and 9B. It is to be understood that the dry installation operations presented in these figures and the accompanying description are generally applicable to all embodiments of the license plate 110, unless otherwise indicated.

The dry installation process begins by identifying the desired mounting location at the front of vehicle 100. In the illustrative embodiment, plate 110 is to be mounted in the center of region 104. Two pieces of tape 944, etc., are positioned along the desired vertical and horizontal axes within region 104 (such as, but not necessarily, the horizontal and vertical midpoints thereof), such that the two pieces of tape intersect at the intended location of the center of plate 110 in region 104.

Two additional pieces of tape 946 are adhered to the top of license-plate assembly 240 within marginal region 211 in preparation for securing plate 110 to vehicle 100.

Plate assembly 240 is then positioned on top of the pieces of tape 944, sighting against alignment indices 416. This ensures that license-plate assembly 240 is level, etc., and positioned as desired. License-plate assembly 240 is adhered to vehicle 100 via tape 946. License-plate assembly 240 is now suspended in place. The two pieces of tape 944 used for alignment purposes are removed from the vehicle and discarded.

Next, the bottom corner of plate 110 is peeled back, and peeling continues until the bottom 25 to 50 percent of the plate 110, across its full width, is pulled away from backing 212. While continuing to suspend the peeled portion of plate 110 away from vehicle 100, backing 212 is folded horizontally "back" (i.e., towards vehicle 100), creating crease 948 in backing 212.

Next, pressure is applied to the top-center of plate 110, such as via an installer's hand, with the continuing application of pressure towards the bottom-right of plate 110, ensuring crease 948 in backing 212 is flattened against vehicle 100. Once pressure has been applied to the bottom-right corner of plate 110, continuing pressure is applied to plate moving along the plate towards the bottom-left corner thereof. Any air bubbles should be pressed out as pressure is applied.

The two pieces of tape 946 are next removed from the top of plate assembly 240, permitting the plate assembly to fall forward and away from vehicle 100. The dry installation continues by peeling backing 212 away from plate 110, ensuring that the plate is kept away from vehicle 100. This is important since once backing 212 is removed, the adhesive on the vehicle-facing side of plate 110 is exposed. While keeping plate 110 away from vehicle 100, pressure is applied to plate 110, moving from the right side of the plate to the left side of the plate over a relatively narrow vertical segment of the plate. After completing a pass, index upward, repeating the movement. Pressure is applied in this fashion until the top of the plate is reached, completing the installation process.

It will be appreciated that the pressure may be initially applied moving toward the bottom left of the plate, such that the subsequent indexed application of pressure proceeds in a left side-to-right side (of the plate) fashion.

When installing a plate that includes security scoring 742, plate assembly 240 will include layer 738, which is the (clear) transfer mask layer. In such a case, layer 738 is removed following completion of the installation process described above.

In addition to the aforementioned "dry" installation method, plate 110 can be installed by a "wet" installation method. In some embodiments, the wet application uses a solution of water and a viscous liquid, such as baby shampoo (for example, Johnson & Johnson brand Johnson's baby shampoo). A mixture of 2 tablespoons of Johnson's baby shampoo in 32 ounces of clean, filtered water has proven to be suitable for this purpose. For wet installation, the solution is applied to the intended installation location. Once the location of the plate is settled according to the method described above, a squeegee is applied to the front of the plate, working center-outward toward the edges thereof, removing all solution and air bubbles.

FIGS. 10A through 10C, and FIGS. 11A through 11J depict an exemplary method for installing plate 110 at the back of a vehicle.

For best aesthetic presentation of plate 110, there must be: (1) a smooth mounting area devoid of holes or anomalies in the surface, and (2) a sufficient amount of such surface area available to mount the plate. There are two primary situations in which these conditions are not met. The first is encountered when the front end of a vehicle does not have enough flat, smooth surface area to provide adequate mounting space. This situation often arises with many late-model performance vehicles, such as those offered by German luxury brands, whose vehicles feature large grills and diminutive bumper areas. A second situation in which the aforementioned conditions are not met is at the rear of most vehicles, regardless of production year or brand. Typically, the manufacturer or dealership has already provided mounting locations (i.e., physical holes) to secure a traditional rigid license plate. For best aesthetic results, plate 110 should not be applied directly over such holes.

In scenarios in which the aforementioned conditions are not met, plate holder 1050, depicted in FIGS. 10A-10C, is used in conjunction with embodiments of the invention. Plate holder 1050 provides a smooth, obstruction-free mounting surface with adequate space, and its presence obscures any otherwise visible mounting hardware/fasteners that are provided with the vehicle, such as to secure a traditional license plate.

In the embodiment depicted in FIG. 10A, plate holder 1050 includes four mounting holes 1054. In the embodiment depicted in FIG. 10B, plate holder 1050 includes two mounting holes 1054, which is usually sufficient for securely mounting the plate holder. The mounting holes are counterbored to permit the head of appropriately configured fasteners 1056 (typically screws) to be recessed within an upper region of the bore so that the top surface of fastener 1056 is flush with the surface of plate holder 1050.

In the illustrative embodiment, plate holder 1050 is slightly (e.g., about $1/16^{th}$ of inch, etc.) larger in height and width than plate 110. As illustrated in FIG. 10C, this creates buffer zone 1055 between the perimeter of plate 110 and perimeter of plate holder 1050, which aids in protecting the edges of plate 110. In the illustrative embodiment, plate holder 1050 has radius corners 1052 of one-half inch, which match the radii found on a traditional vehicular license plate for the U.S. market. As appropriate, the dimensions of the radius corners can be changed to accommodate alternative-sized license plates found outside of the U.S. market, such as for the European Union, Asia, or the UAE.

Holder 1050 comprises any hard material that is resonant free, inert, drillable and suitable for processing via a laser cutting bed or CNC machining. Non-limiting examples of suitable material of construction for holder 1050 include cast acrylic, stainless steel, aluminum, brass, titanium, hardwoods such as ipe or teak, composite materials such as glass or fiber infused plastics, carbon fiber, Kevlar, etc.

FIGS. 11A through 11J depict details of an exemplary dry installation method for installing plate 110 at the back of a vehicle. For clarity, all visual indications normally present on plate 110 are not depicted in FIGS. 11A-11J. It is to be understood that the installation operations presented in these figures and the accompanying description are generally applicable to all embodiments of the license plate 110, unless otherwise indicated.

Any existing license-plate hardware present on the back of car 100 is removed. Per FIGS. 11A and 11B, the openings in plate holder 1050 are aligned with existing mounting-screw holes on the back of vehicle 100. Supplied fasteners 1056 are inserted into plate holder 1050, and an appropriate hand tool is used to screw the fasteners 1056 into the vehicle's existing mounting screw holes, thereby coupling plate holder 1050 to the back of vehicle 100. The head of fasteners 1056 should be flush with, or slightly below the surface of plate holder 1050, and must not protrude beyond such surface.

The process for installing plate 110 on the rear of a vehicle follows the same overall process as previously described for dry or wet plate installation at the front of the vehicle. More particularly, and referring now to FIGS. 11C through 11E, a bottom corner of plate 110 is peeled from backing 212. Peeling is continued until the entire width of the bottom half of plate 110 is peeled away from backing 212. While continuing to horizontally suspend the bottom half of plate 110 away from plate holder 1050, backing 212 is folded horizontally 'back' unto itself towards the vehicle, placing hard crease 948 into backing 212.

With reference to FIGS. 11F through 11I, plate 110 is suspended over plate holder 1050, and alignment is verified to ensure that plate 110 is aligned with plate holder 1050. Next, pressure is applied to the top-center of plate 110, such as via an installer's hand, with the continuing application of pressure towards the bottom-right corner of plate 110, ensuring creased fold 948 in backing 212 is flattened against holder 1050. Once pressure has been applied to the bottom-right corner of plate 110, continuing pressure is applied to plate 110, moving along the plate towards the bottom-left corner thereof. Any air bubbles should be pressed out as pressure is applied.

Installation continues by peeling backing 212 away from plate 110, ensuring that plate 110 is kept away from plate holder 1050. This is important since once backing 212 is removed, the adhesive on the vehicle-facing side of plate 110 is exposed. While keeping plate 110 away from plate holder 1050, pressure is applied to plate 110, moving from the right side to the left side of the plate over a relatively narrow vertical segment of the plate. After completing a pass, index upward, then repeating the movement. Pressure is applied in this fashion until the top of the plate is reached, completing the installation process.

It will be appreciated that the pressure may be initially applied moving toward the bottom left of the plate, such that the subsequent indexed application of pressure proceeds from the left side of the plate to the right side of the plate. As an alternative to the dry installation process discussed above, plate 110 can be wet installed. This is accomplished using the same methodology as discussed for front plate installation.

Figure 12A:
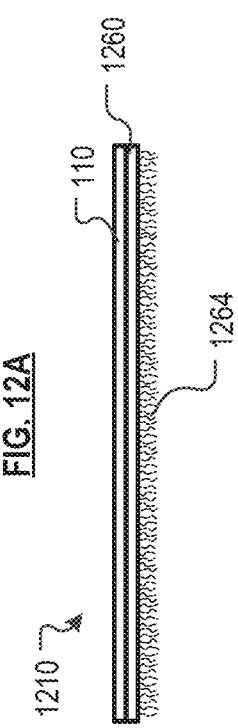
FIG. 12A depicts an embodiment of a license plate suitable for dashboard placement, in accordance with the present invention.

In some alternative embodiments, plate 110 is configured for placement on the dashboard of vehicle 100, rather than the front of vehicle 100. FIG. 12A depicts plate 1210, which is an embodiment of a plate configured for dashboard placement.

Referring now to FIG. 12A, plate 1210, which is suitable for dashboard placement, comprises plate 110, mounting layer 1260, and surface treatment 1264. Mounting layer 1260 is coupled to plate 110 via the adhesive surface of plate 110. Mounting layer 1260 can be flexible, semi-rigid, or rigid. In some embodiments, mounting layer 1260 is a sheet of high-density polyethylene, the sheet having a typical thickness in the range of about 20 to 30 mils (0.02 to 0.03 inches). Since mounting layer 1260 is "below" plate 110, the mounting layer need not be optically transparent.

The dimensions of mounting layer 1260 are slightly larger than the dimensions of plate 110 to prevent overhang thereof, which will damage plate 110. In particular, mounting layer 1260 is larger than plate 110 by about $\frac{1}{16}$ inch in total width and $\frac{1}{16}$ inch in total height, thus providing a margin of about $\frac{1}{32}$ inch beyond the perimeter of plate 110.

Surface treatment 1264 provides a relatively high-friction surface, the intent being to decrease the tendency for the plate to slide along the dashboard while the vehicle is in use, while at the same time avoid any damage (e.g., marring of the finish of the vinyl/leather, etc.) to the dashboard. That is, the surface treatment increases the static coefficient of friction (as well as the dynamic coefficient of friction) of mounting layer 1260. Additionally, the surface treatment is not adhesive, so that plate 1210 will not adhere to the dashboard.

In some embodiments, surface treatment 1264 are fibers that are securely adhered to mounting layer 1260 via an adhesive, such as a pressure sensitive adhesive. If the material serving as mounting layer 1260 does not, as supplied, include such an adhesive, it is applied (e.g., manually, etc.) to the underside of mounting surface 1260.

The fibers selected for use as surface treatment 1264, which may be natural or synthetic, are selected and/or otherwise treated to satisfy the above-mentioned goals. That is, to decrease the tendency for the plate to slide along the dashboard while the vehicle is in use, while at the same time avoid any damage (e.g., marring of the finish of the vinyl/leather, etc.) to the dashboard. And not having any tendency to adhere to the dashboard. In some of such embodiments, the fibers have a suede-like texture. Alternatively, or in addition to the selection of a suitably textured fiber, a friction enhancer can be applied to the fibers. In some other embodiments, surface treatment 1264 is implemented as materials other than fibers, such as segments of leather, rubber, or other materials that increase the static coefficient of friction of the mounting layer 1264.

Figure 12B:
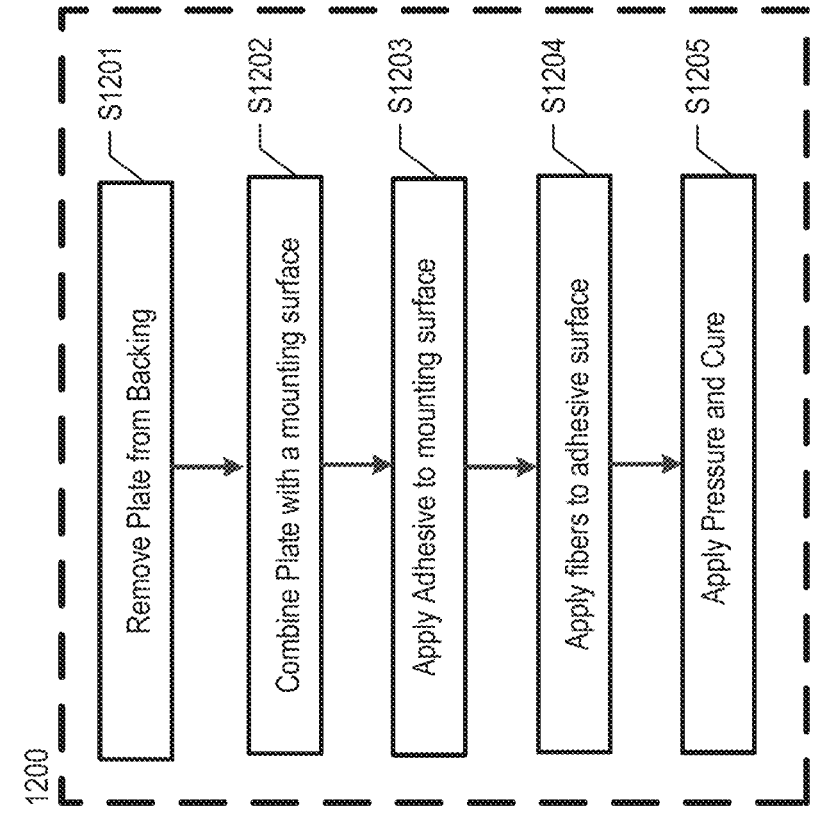
FIG. 12B depicts a method for manufacturing the license plate of FIG. 12A.

FIG. 12B depicts method 1200 for fabricating plates suitable for dashboard placement, such as plate 1210. The method begins with a fabricated license-plate assembly (i.e., plate and backing), such as license-plate assembly 240.

In task S1201, a plate, such as plate 110, is removed from the backing, such as backing 212, of license-plate assembly 240. Proceeding with task S1202, a mounting layer, such as mounting layer 1260 (FIG. 12A) is applied to the back (i.e., the adhesive-bearing side adhesive) of plate 110.

In task S1203, adhesive is applied to the exposed side of the mounting layer, to the extent such adhesive is not provided with the as-supplied mounting surface.

In task S1204, surface treatment 1264 for increasing friction, such as fibers (or the alternative materials mentioned), are applied to the exposed, adhesive-bearing surface that is present after the completion of tasks S1202 and S1203. The fibers, etc., are applied via a mechanical applicator.

If required, the adhesive is cured in task S1205, such as by the application of pressure for a period of time, as a function of the adhesive. In some embodiments, pressure is applied by placing the surface-treatment-bearing modified plate between two rigid plates. It is within the capabilities of those skilled the art to select an appropriate adhesive and, if the adhesive requires curing, to determine appropriate curing conditions (e.g., the amount of applied pressure, time at pressure, etc.).

It is to be understood that the disclosure describes a few embodiments and that many variations of the invention can easily be devised by those skilled in the art after reading this disclosure and that the scope of the present invention is to be determined by the following claims.

For example, various layers structures are defined for each of plates 310, 510, and plate 610. However, plates in accordance with the present teachings having different arrangements of layers than those depicted are contemplated. Consider, for example, license plate 610, which discloses the following arrangement of layers, starting from the bottommost layer: layer 324→licensing information layer 326→supplemental-information layer 530→first anti-alteration/barrier layer 532-1→communications layer 634→second anti-alteration/barrier layer 532-2→protection layer 328. By way of illustration, in two other embodiments, license plates in accordance with the present invention have the following arrangements of layers:

layer 324→licensing information layer 326→communications layer 634→anti-alteration/barrier layer 532→protection layer 328.

layer 324→licensing information layer 326→first anti-alteration/barrier layer 532-1→communications layer 634→2nd anti-alteration/barrier layer 532-2→protection layer 328.

As will be appreciated by those skilled in the art, in light of the present teachings, additional arrangements of layers are possible. For example, the position of certain layers can be switched, such as, for example, switching the positions in the "stack" of licensing information layer 326 and communications layer 634.

What is claimed:

1. A license-plate assembly comprising:
   a flexible license plate, the flexible license plate including:
   (i) a retroreflective film having a first side and a second side, the first side having a pressure-sensitive adhesive applied thereto,
   (ii) a licensing-information layer, the licensing-information layer consisting of ink, at least some of which ink is deposited in the form of alphanumeric characters on the second side of the retroreflective film, the alphanumeric characters providing vehicle license information, and
   (iii) a protection layer overlying the licensing-information layer and retroreflective film, wherein the protection layer comprises a film that is optically transparent;
   a backing having a first side and a second side, wherein the flexible license plate is disposed on the second side of the backing, the backing extending beyond a perimeter of the flexible license plate and, in so extending, defining a marginal region; and
   plural indices disposed within the marginal region, the indices being symmetrically spaced about respective horizontal and vertical center points of the flexible license plate, the indices facilitating alignment of the flexible license plate during installation thereof on a motor vehicle.

2. The license-plate assembly of claim 1 wherein badging appears between the plural indices, and wherein badging includes at least one of the following: branding information, instructional information, and regulatory information.

3. The license-plate assembly of claim 1 wherein badging appears on the first side of the backing, and wherein badging includes at least one of the following: branding information, instructional information, and regulatory information.

4. The license-plate assembly of claim 1 wherein the ink is a solvent-based ink.

5. The license-plate assembly of claim 1 wherein the flexible license plate comprises a supplemental-information layer, wherein the supplemental information layer is disposed above the licensing-information layer, wherein the supplemental information layer includes ink deposited in the form of one or more supplemental-information-bearing features, including one or more holograms, and/or one or more watermarks, and/or one or more QR-codes.

6. The license-plate assembly of claim 5 wherein the flexible license plate includes a first anti-alteration/barrier layer, wherein the first anti-alteration/barrier layer is disposed on the supplemental-information layer and comprises optically transparent ink.

7. The license-plate assembly of claim 6 wherein the flexible license plate includes a communications layer, wherein the communications layer is disposed on the first anti-alteration/barrier layer, and wherein the communications layer comprises a wireless communications device.

8. The license-plate assembly of claim 7 wherein the wireless communications device comprises an RFID inlay.

9. The license-plate assembly of claim 7 wherein the flexible license plate includes a second anti-alteration/barrier layer, wherein the second anti-alteration/barrier layer is disposed on the communications layer, wherein the second anti-alteration/barrier layer comprises optically transparent ink.

10. The license-plate assembly of claim 1 wherein the flexible license plate includes a communications layer, wherein the communications layer is disposed on the licensing-information layer, and wherein the communications layer comprises a wireless communications device.

11. The license-plate assembly of claim 10 wherein the wireless communications device comprises an RFID inlay.

12. The license-plate assembly of claim 1 wherein the flexible license plate includes a first anti-alteration/barrier layer, wherein the first anti-alteration/barrier layer is disposed on the licensing information layer and comprises optically transparent ink.

13. The license-plate assembly of claim 12 wherein the flexible license plate includes a communications layer, wherein the communications layer is disposed on the first anti-alteration/barrier layer, and wherein the communications layer comprises a wireless communications device.

14. A license-plate assembly comprising:
   a flexible license plate, the flexible license plate having plural layers, including a licensing-information layer, the licensing-information layer consisting of ink, at least some of which ink is deposited in the form of alphanumeric characters on an underlying one of the plural layers, the alphanumeric characters providing license information; and a backing, wherein the flexible license plate is disposed on the backing, the backing extending beyond a perimeter of the flexible license plate and, in so extending, defining a marginal region, wherein plural indices are disposed within the marginal region, the indices being symmetrically spaced about respective horizontal and vertical center points of the flexible license plate, the indices facilitating alignment of the flexible license plate during installation thereof on a motor vehicle.

15. The license-plate assembly of claim 14 wherein the flexible license plate comprises one or more supplemental-information-bearing features, including one or more holograms, and/or one or more watermarks, and/or one or more QR-codes.

16. The license-plate assembly of claim 14 wherein the flexible license plate comprises a wireless communications device.

17. A method for making a license plate assembly, the method comprising:
   providing a retroreflective film disposed on a backing;
   printing alphanumeric characters within a first rectangular region of the retroreflective film, the alphanumeric characters providing vehicle license information and defining a licensing-information layer;
   printing indices within a second region of the retroreflective film, wherein second region surrounds the first region; and
   disposing an optically transparent protection layer over the licensing-information layer and retroreflective film.

18. The method of claim 17 comprising cutting the optically transparent protection layer and the retroreflective film, but not the backing, along a perimeter of the first rectangular region, thereby defining a license plate in the license plate assembly.

19. The method of claim 18 comprising, prior to disposing the optically transparent protection layer, printing at least one or more supplemental-information-bearing features, including one or more holograms, and/or one or more watermarks, and/or one or more QR-codes.

20. The method of claim 19 comprising, prior to disposing the optically transparent protection layer and after ink printing the at least one supplemental-information-bearing feature, forming a communications layer including a wireless communications device.

21. The method of claim 18 comprising, prior to disposing the optically transparent protection layer, forming a communications layer including a wireless communications device.

22. The method of claim 18 comprising:
   removing the backing;
   attaching a mounting layer to the retroreflective film; and
   applying a surface treatment to mounting layer, wherein the surface treatment increases the static coefficient of friction of the mounting layer.

23. A license-plate assembly comprising:
   a flexible license plate, the flexible license plate including:
   (i) a retroreflective film having a first side and a second side, the first side having a pressure-sensitive adhesive applied thereto,
   (ii) a licensing-information layer, the licensing-information layer consisting of ink, at least some of which ink is deposited in the form of alphanumeric characters on the second side of the retroreflective film, the alphanumeric characters providing vehicle license information, and
   (iii) a protection layer overlying the licensing-information layer and retroreflective film, wherein the protection layer comprises a film that is optically transparent;
   a mounting layer, wherein the mounting layer is coupled to the first side of the retroreflective film; and
   a surface treatment disposed on the mounting layer, wherein the surface treatment increases the static coefficient of friction of the mounting layer.

* * * * *